(12) United States Patent
Farrelly

(10) Patent No.: US 8,200,602 B2
(45) Date of Patent: Jun. 12, 2012

(54) SYSTEM AND METHOD FOR CREATING THEMATIC LISTENING EXPERIENCES IN A NETWORKED PEER MEDIA RECOMMENDATION ENVIRONMENT

(75) Inventor: Eugene Matthew Farrelly, Cary, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 582 days.

(21) Appl. No.: 12/472,631

(22) Filed: May 27, 2009

(65) Prior Publication Data

US 2010/0198767 A1   Aug. 5, 2010

Related U.S. Application Data

(60) Provisional application No. 61/149,216, filed on Feb. 2, 2009.

(51) Int. Cl.
*G06F 17/00* (2006.01)
*G06N 5/02* (2006.01)

(52) U.S. Cl. ........................................................ 706/46
(58) Field of Classification Search ...................... 706/46
See application file for complete search history.

(56) References Cited

U.S. PATENT DOCUMENTS

| | | | |
|---|---|---|---|
| 4,870,579 A | 9/1989 | Hey | |
| 5,621,456 A | 4/1997 | Florin et al. | |
| 5,724,567 A | 3/1998 | Rose et al. | |
| 5,771,778 A | 6/1998 | MacLean, IV | |
| 5,956,027 A | 9/1999 | Krishnamurthy | |
| 5,960,437 A | 9/1999 | Krawchuk et al. | |
| 5,963,916 A | 10/1999 | Kaplan | |
| 6,134,552 A | 10/2000 | Fritz et al. | |
| 6,195,657 B1 | 2/2001 | Rucker et al. | |
| 6,266,649 B1 | 7/2001 | Linden et al. | |
| 6,314,420 B1 | 11/2001 | Lang et al. | |
| 6,317,722 B1 | 11/2001 | Jacobi et al. | |
| 6,353,823 B1 | 3/2002 | Kumar | |
| 6,388,714 B1 | 5/2002 | Schein et al. | |
| 6,438,579 B1 | 8/2002 | Hosken | |
| 6,498,955 B1 | 12/2002 | McCarthy et al. | |
| 6,526,411 B1 | 2/2003 | Ward | |
| 6,567,797 B1 | 5/2003 | Schuetze et al. | |
| 6,587,127 B1 | 7/2003 | Leeke et al. | |
| 6,587,850 B2 | 7/2003 | Zhai | |
| 6,609,253 B1 | 8/2003 | Swix et al. | |
| 6,615,208 B1 | 9/2003 | Behrens et al. | |

(Continued)

FOREIGN PATENT DOCUMENTS

CN      1208930 A      2/1999

(Continued)

OTHER PUBLICATIONS

A Context Aware Personalized Media Recommendation System: An Adaptive Evolutionary Algorithm Approach, Gopalan, K.S.; Nathan, S.; Bhanu, T.C.H.; Channa, A.B.; Saraf, P.; Bio-Inspired Computing: Theories and Applications (BIC-TA), 2011 Sixth International Conference on Digital Object Identifier: 10.1109/BIC-TA.2011.4 Pub Year: 2011, pp. 45-50.*

(Continued)

*Primary Examiner* — Michael B Holmes
(74) *Attorney, Agent, or Firm* — Withrow & Terranova, PLLC

(57) ABSTRACT

Systems and methods for providing a thematic playback experience in a peer-to-peer media recommendation system are disclosed.

34 Claims, 18 Drawing Sheets

U.S. PATENT DOCUMENTS

| | | |
|---|---|---|
| 6,629,104 B1 | 9/2003 | Parulski et al. |
| 6,636,836 B1 | 10/2003 | Pyo |
| 6,654,786 B1 | 11/2003 | Fox et al. |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,757,517 B2 | 6/2004 | Chang |
| 6,757,691 B1 | 6/2004 | Welsh et al. |
| 6,801,909 B2 | 10/2004 | Delgado et al. |
| 6,865,565 B2 | 3/2005 | Rainsberger et al. |
| 6,904,264 B1 | 6/2005 | Frantz |
| 6,912,528 B2 | 6/2005 | Homer |
| 6,941,275 B1 | 9/2005 | Swierczek |
| 6,941,324 B2 | 9/2005 | Plastina et al. |
| 6,947,922 B1 | 9/2005 | Glance |
| 6,973,475 B2 | 12/2005 | Kenyon et al. |
| 6,976,228 B2 | 12/2005 | Bernhardson |
| 6,986,136 B2 | 1/2006 | Simpson et al. |
| 6,987,221 B2 | 1/2006 | Platt |
| 6,990,453 B2 | 1/2006 | Wang et al. |
| 7,013,301 B2 | 3/2006 | Holm et al. |
| 7,035,871 B2 | 4/2006 | Hunt et al. |
| 7,047,406 B2 | 5/2006 | Schleicher et al. |
| 7,072,846 B1 | 7/2006 | Robinson |
| 7,072,886 B2 | 7/2006 | Salmenkaita et al. |
| 7,075,000 B2 | 7/2006 | Gang et al. |
| 7,076,553 B2 | 7/2006 | Chan et al. |
| 7,085,747 B2* | 8/2006 | Schaffer et al. ............... 706/12 |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,145,678 B2 | 12/2006 | Simpson et al. |
| 7,146,627 B1 | 12/2006 | Ismail et al. |
| 7,171,174 B2 | 1/2007 | Ellis et al. |
| 7,177,872 B2 | 2/2007 | Schwesig et al. |
| 7,219,145 B2 | 5/2007 | Chmaytelli et al. |
| 7,222,187 B2 | 5/2007 | Yeager et al. |
| 7,240,358 B2 | 7/2007 | Horn et al. |
| 7,277,955 B2 | 10/2007 | Elliott |
| 7,283,992 B2 | 10/2007 | Liu et al. |
| 7,296,032 B1 | 11/2007 | Beddow |
| 7,305,449 B2 | 12/2007 | Simpson et al. |
| 7,340,481 B1 | 3/2008 | Baer et al. |
| 7,437,364 B1 | 10/2008 | Fredricksen et al. |
| 7,441,041 B2 | 10/2008 | Williams et al. |
| 7,444,339 B2 | 10/2008 | Matsuda et al. |
| 7,457,790 B2* | 11/2008 | Kochunni et al. ............. 706/45 |
| 7,463,890 B2 | 12/2008 | Herz et al. |
| 7,469,283 B2 | 12/2008 | Eyal et al. |
| 7,496,623 B2 | 2/2009 | Szeto et al. |
| 7,509,291 B2 | 3/2009 | McBride et al. |
| 7,512,658 B2 | 3/2009 | Brown et al. |
| 7,523,156 B2 | 4/2009 | Giacalone, Jr. |
| 7,548,915 B2 | 6/2009 | Ramer et al. |
| 7,590,546 B2 | 9/2009 | Chuang |
| 7,594,246 B1 | 9/2009 | Billmaier et al. |
| 7,614,006 B2 | 11/2009 | Molander |
| 7,623,843 B2 | 11/2009 | Squibbs |
| 7,627,644 B2 | 12/2009 | Slack-Smith |
| 7,644,166 B2 | 1/2010 | Appelman et al. |
| 7,653,654 B1 | 1/2010 | Sundaresan |
| 7,657,337 B1* | 2/2010 | Evans et al. .................... 700/94 |
| 7,676,753 B2 | 3/2010 | Bedingfield |
| 7,680,959 B2* | 3/2010 | Svendsen ....................... 709/248 |
| 7,720,871 B2 | 5/2010 | Rogers et al. |
| 7,725,494 B2 | 5/2010 | Rogers et al. |
| 7,730,216 B1 | 6/2010 | Issa et al. |
| 7,734,569 B2* | 6/2010 | Martin et al. ..................... 1/1 |
| 7,751,773 B2 | 7/2010 | Linden |
| 7,761,399 B2 | 7/2010 | Evans |
| 7,804,016 B2* | 9/2010 | Sagoo et al. ..................... 84/612 |
| 7,805,129 B1 | 9/2010 | Issa et al. |
| 7,827,110 B1 | 11/2010 | Wieder |
| 7,865,522 B2* | 1/2011 | Purdy et al. .................... 707/790 |
| 7,877,387 B2* | 1/2011 | Hangartner ................... 707/736 |
| 7,886,072 B2 | 2/2011 | Wormington et al. |
| 7,970,922 B2 | 6/2011 | Svendsen |
| 8,059,646 B2 | 11/2011 | Svendsen et al. |
| 2001/0013009 A1 | 8/2001 | Greening et al. |
| 2001/0021914 A1 | 9/2001 | Jacobi et al. |
| 2001/0025259 A1 | 9/2001 | Rouchon |
| 2002/0052207 A1 | 5/2002 | Hunzinger |
| 2002/0052674 A1 | 5/2002 | Chang et al. |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0108112 A1 | 8/2002 | Wallace et al. |
| 2002/0116533 A1 | 8/2002 | Holliman et al. |
| 2002/0138836 A1 | 9/2002 | Zimmerman |
| 2002/0165793 A1 | 11/2002 | Brand et al. |
| 2002/0178057 A1 | 11/2002 | Bertram et al. |
| 2002/0194325 A1 | 12/2002 | Chmaytelli et al. |
| 2002/0194356 A1 | 12/2002 | Chan et al. |
| 2003/0001907 A1 | 1/2003 | Bergsten et al. |
| 2003/0005074 A1 | 1/2003 | Herz et al. |
| 2003/0014407 A1 | 1/2003 | Blatter et al. |
| 2003/0018799 A1 | 1/2003 | Eyal |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0069806 A1 | 4/2003 | Konomi et al. |
| 2003/0084044 A1 | 5/2003 | Simpson et al. |
| 2003/0084086 A1 | 5/2003 | Simpson et al. |
| 2003/0084151 A1 | 5/2003 | Simpson et al. |
| 2003/0089218 A1 | 5/2003 | Gang et al. |
| 2003/0097186 A1 | 5/2003 | Gutta et al. |
| 2003/0115167 A1 | 6/2003 | Sharif et al. |
| 2003/0135513 A1 | 7/2003 | Quinn et al. |
| 2003/0137531 A1 | 7/2003 | Katinsky et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1 | 10/2003 | Hoch |
| 2003/0229537 A1 | 12/2003 | Dunning et al. |
| 2003/0232614 A1 | 12/2003 | Squibbs |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019497 A1 | 1/2004 | Volk et al. |
| 2004/0034441 A1 | 2/2004 | Eaton et al. |
| 2004/0073919 A1 | 4/2004 | Gutta |
| 2004/0088271 A1 | 5/2004 | Cleckler |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0260778 A1 | 12/2004 | Banister et al. |
| 2004/0267604 A1 | 12/2004 | Gross |
| 2005/0020223 A1 | 1/2005 | Ellis et al. |
| 2005/0021420 A1 | 1/2005 | Michelitsch et al. |
| 2005/0021470 A1 | 1/2005 | Martin et al. |
| 2005/0021678 A1 | 1/2005 | Simyon et al. |
| 2005/0022239 A1 | 1/2005 | Meuleman |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0071418 A1 | 3/2005 | Kjellberg et al. |
| 2005/0091107 A1 | 4/2005 | Blum |

| Publication No. | Date | Inventor |
|---|---|---|
| 2005/0120053 A1 | 6/2005 | Watson |
| 2005/0125221 A1 | 6/2005 | Brown et al. |
| 2005/0125222 A1 | 6/2005 | Brown et al. |
| 2005/0131866 A1 | 6/2005 | Badros |
| 2005/0138198 A1 | 6/2005 | May |
| 2005/0154608 A1 | 7/2005 | Paulson et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |
| 2005/0197961 A1 | 9/2005 | Miller et al. |
| 2005/0228830 A1 | 10/2005 | Plastina et al. |
| 2005/0246391 A1 | 11/2005 | Gross |
| 2005/0251455 A1 | 11/2005 | Boesen |
| 2005/0251807 A1 | 11/2005 | Weel |
| 2005/0256756 A1 | 11/2005 | Lam et al. |
| 2005/0256866 A1 | 11/2005 | Lu et al. |
| 2005/0267944 A1 | 12/2005 | Little, II |
| 2005/0278377 A1 | 12/2005 | Mirrashidi et al. |
| 2005/0278758 A1 | 12/2005 | Bodlaender |
| 2005/0286546 A1 | 12/2005 | Bassoli et al. |
| 2005/0289236 A1 | 12/2005 | Hull et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0053080 A1 | 3/2006 | Edmonson et al. |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085383 A1 | 4/2006 | Mantle et al. |
| 2006/0100924 A1 | 5/2006 | Tevanian |
| 2006/0126135 A1 | 6/2006 | Stevens et al. |
| 2006/0130120 A1 | 6/2006 | Brandyberry et al. |
| 2006/0143236 A1 | 6/2006 | Wu |
| 2006/0156242 A1 | 7/2006 | Bedingfield |
| 2006/0167991 A1 | 7/2006 | Heikes et al. |
| 2006/0173910 A1 | 8/2006 | McLaughlin |
| 2006/0174277 A1 | 8/2006 | Sezan et al. |
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200432 A1 | 9/2006 | Flinn et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0224757 A1 | 10/2006 | Fang et al. |
| 2006/0227673 A1 | 10/2006 | Yamashita et al. |
| 2006/0242201 A1 | 10/2006 | Cobb et al. |
| 2006/0242206 A1 | 10/2006 | Brezak et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0273155 A1 | 12/2006 | Thackston |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0288074 A1 | 12/2006 | Rosenberg |
| 2006/0293909 A1 | 12/2006 | Miyajima et al. |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0028171 A1 | 2/2007 | MacLaurin |
| 2007/0033292 A1 | 2/2007 | Sull et al. |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0083929 A1 | 4/2007 | Sprosts et al. |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0104138 A1 | 5/2007 | Rudolf et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0195373 A1 | 8/2007 | Singh |
| 2007/0198485 A1 | 8/2007 | Ramer et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0233736 A1 | 10/2007 | Xiong et al. |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0264982 A1 | 11/2007 | Nguyen et al. |
| 2007/0265870 A1 | 11/2007 | Song et al. |
| 2007/0269169 A1 | 11/2007 | Stix et al. |
| 2007/0277202 A1 | 11/2007 | Lin et al. |
| 2007/0282949 A1 | 12/2007 | Fischer et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |
| 2008/0032723 A1 | 2/2008 | Rosenberg |
| 2008/0033959 A1 | 2/2008 | Jones |
| 2008/0040313 A1 | 2/2008 | Schachter |
| 2008/0046948 A1 | 2/2008 | Verosub |
| 2008/0052371 A1 | 2/2008 | Partovi et al. |
| 2008/0052380 A1 | 2/2008 | Morita et al. |
| 2008/0052630 A1 | 2/2008 | Rosenbaum |
| 2008/0059422 A1 | 3/2008 | Tenni et al. |
| 2008/0059576 A1 | 3/2008 | Liu et al. |
| 2008/0080774 A1 | 4/2008 | Jacobs et al. |
| 2008/0085769 A1 | 4/2008 | Lutnick et al. |
| 2008/0091771 A1 | 4/2008 | Allen et al. |
| 2008/0120501 A1 | 5/2008 | Jannink et al. |
| 2008/0133601 A1 | 6/2008 | Martin Cervera et al. |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147482 A1 | 6/2008 | Messing et al. |
| 2008/0147711 A1 | 6/2008 | Spiegelman et al. |
| 2008/0147876 A1 | 6/2008 | Campbell et al. |
| 2008/0160983 A1 | 7/2008 | Poplett et al. |
| 2008/0176562 A1 | 7/2008 | Howard |

| | | |
|---|---|---|
| 2008/0178094 A1 | 7/2008 | Ross |
| 2008/0181536 A1 | 7/2008 | Linden |
| 2008/0189336 A1 | 8/2008 | Prihodko |
| 2008/0189391 A1 | 8/2008 | Koberstein et al. |
| 2008/0189655 A1 | 8/2008 | Kol |
| 2008/0195657 A1 | 8/2008 | Naaman et al. |
| 2008/0195664 A1 | 8/2008 | Maharajh et al. |
| 2008/0208823 A1 | 8/2008 | Hicken |
| 2008/0209013 A1 | 8/2008 | Weel |
| 2008/0228945 A1 | 9/2008 | Yoon et al. |
| 2008/0235632 A1 | 9/2008 | Holmes |
| 2008/0242221 A1 | 10/2008 | Shapiro et al. |
| 2008/0242280 A1 | 10/2008 | Shapiro et al. |
| 2008/0243733 A1 | 10/2008 | Black |
| 2008/0244681 A1 | 10/2008 | Gossweiler et al. |
| 2008/0250067 A1 | 10/2008 | Svendsen |
| 2008/0250312 A1 | 10/2008 | Curtis |
| 2008/0270561 A1 | 10/2008 | Tang et al. |
| 2008/0276279 A1 | 11/2008 | Gossweiler et al. |
| 2008/0288588 A1 | 11/2008 | Andam et al. |
| 2008/0301118 A1 | 12/2008 | Chien et al. |
| 2008/0301186 A1 | 12/2008 | Svendsen |
| 2008/0301187 A1 | 12/2008 | Svendsen |
| 2008/0301240 A1 | 12/2008 | Svendsen |
| 2008/0301241 A1 | 12/2008 | Svendsen |
| 2008/0306826 A1 | 12/2008 | Kramer et al. |
| 2008/0307462 A1 | 12/2008 | Beetcher et al. |
| 2008/0307463 A1 | 12/2008 | Beetcher et al. |
| 2008/0313541 A1 | 12/2008 | Shafton et al. |
| 2008/0319833 A1 | 12/2008 | Svendsen |
| 2009/0006368 A1 | 1/2009 | Mei et al. |
| 2009/0006374 A1 | 1/2009 | Kim et al. |
| 2009/0007198 A1 | 1/2009 | Lavender et al. |
| 2009/0013347 A1 | 1/2009 | Ahanger et al. |
| 2009/0042545 A1 | 2/2009 | Avital et al. |
| 2009/0046101 A1 | 2/2009 | Askey et al. |
| 2009/0048992 A1 | 2/2009 | Svendsen et al. |
| 2009/0049030 A1 | 2/2009 | Svendsen et al. |
| 2009/0049045 A1 | 2/2009 | Askey et al. |
| 2009/0055385 A1 | 2/2009 | Jeon et al. |
| 2009/0055396 A1 | 2/2009 | Svendsen et al. |
| 2009/0055467 A1 | 2/2009 | Petersen |
| 2009/0055759 A1 | 2/2009 | Svendsen |
| 2009/0069911 A1 | 3/2009 | Stefik |
| 2009/0069912 A1 | 3/2009 | Stefik |
| 2009/0070184 A1 | 3/2009 | Svendsen |
| 2009/0070350 A1 | 3/2009 | Wang |
| 2009/0076881 A1 | 3/2009 | Svendsen |
| 2009/0077041 A1 | 3/2009 | Eyal et al. |
| 2009/0077052 A1 | 3/2009 | Farrelly |
| 2009/0077124 A1 | 3/2009 | Spivack et al. |
| 2009/0077220 A1 | 3/2009 | Svendsen et al. |
| 2009/0083116 A1 | 3/2009 | Svendsen |
| 2009/0083117 A1 | 3/2009 | Svendsen et al. |
| 2009/0083362 A1 | 3/2009 | Svendsen |
| 2009/0083541 A1 | 3/2009 | Levine |
| 2009/0089288 A1 | 4/2009 | Petersen |
| 2009/0093300 A1 | 4/2009 | Lutnick et al. |
| 2009/0094248 A1 | 4/2009 | Petersen |
| 2009/0119294 A1 | 5/2009 | Purdy et al. |
| 2009/0125588 A1 | 5/2009 | Black et al. |
| 2009/0129671 A1 | 5/2009 | Hu et al. |
| 2009/0132527 A1 | 5/2009 | Sheshagiri et al. |
| 2009/0138457 A1 | 5/2009 | Askey |
| 2009/0138505 A1 | 5/2009 | Purdy |
| 2009/0157795 A1 | 6/2009 | Black |
| 2009/0164199 A1 | 6/2009 | Amidon et al. |
| 2009/0164429 A1 | 6/2009 | Svendsen et al. |
| 2009/0164514 A1 | 6/2009 | Svendsen et al. |
| 2009/0164516 A1 | 6/2009 | Svendsen et al. |
| 2009/0164641 A1 | 6/2009 | Rogers et al. |
| 2009/0177301 A1 | 7/2009 | Hayes |
| 2009/0222520 A1 | 9/2009 | Sloo et al. |
| 2009/0259621 A1 | 10/2009 | Svendsen et al. |
| 2010/0017261 A1 | 1/2010 | Evans et al. |
| 2010/0031366 A1 | 2/2010 | Knight et al. |
| 2010/0185732 A1 | 7/2010 | Hyman |
| 2010/0198767 A1 | 8/2010 | Farrelly |
| 2010/0199218 A1 | 8/2010 | Farrelly et al. |
| 2010/0199295 A1 | 8/2010 | Katpelly et al. |
| 2010/0228740 A1 | 9/2010 | Cannistraro et al. |
| 2011/0016483 A1 | 1/2011 | Opdycke |
| 2011/0034121 A1 | 2/2011 | Ng et al. |

FOREIGN PATENT DOCUMENTS

| | | |
|---|---|---|
| EP | 0898278 A2 | 2/1999 |
| EP | 1536352 A1 | 6/2005 |
| EP | 1835455 A1 | 9/2007 |
| GB | 2372850 A | 9/2002 |
| GB | 2397205 A | 7/2004 |
| JP | 2005-321668 | 11/2005 |
| WO | 01/25947 A1 | 4/2001 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006075032 A1 | 7/2006 |
| WO | 2006/126135 A2 | 11/2006 |
| WO | 2007092053 A1 | 8/2007 |

OTHER PUBLICATIONS

"UpTo11.net—Music Recommendations and Search," http://www.upto11.net/, copyright 2005-2006 Upto11.net, printed Feb. 7, 2007, 1 page.

"Webjay—Playlist Community," http://www.webjay.org/, copyright 2006 Yahoo! Inc., printed Feb. 7, 2007, 5 pages.

"Wired News:," http://www.wired.com/news/digiwoo/1,57634-0.html, copyright 2005 Lycos, Inc., printed Oct. 9, 2006, 3 pages.

"Not safe for work—Wikipedia, the free encyclopedia," http://en.wikipedia.org/wiki/Work_safe, printed Nov. 8, 2007, 2 pages.

"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

"Yahoo Music Jukebox—Wikipedia, the free encyclopedia," http://en.wikipedia.org/wiki/Yahoo_music_engine, printed Aug. 8, 2006, 1 page.

"LAUNCHcast Radio—Yahoo! Messenger," http://messenger.yahoo.com/launch.php, copyright 2007 Yahoo! Inc., printed Nov. 8, 2007, 1 page.

"Music Downloads—Over 2 Million Songs—Try It Free—Yahoo! Music," http://music.yahoo.com/ymu/default.asp, copyright 2006 Yahoo! Inc., printed Feb. 7, 2007, 1 page.

"YouTube—Broadcast Yourself.," http://www.youtube.com/, copyright 2007 YouTube, LLC, printed Oct. 26, 2007, 2 pages.

"Zune.net—How-To-Share Audio Files Zune to Zune," http://web.archive.org/web/20070819121705/http://www.zune.net/en-us/support/howto/z..., copyright 2007 Microsoft Corporation, printed Nov. 14, 2007, 2 pages.

"Goombah—Preview," http://www.goombah.com/preview.html, printed Jan. 8, 2008, 5 pages.

Jeff Mascia et al., "Lifetrak: Music in Tune With Your Life," copyright 2006, 11 pages.

Jun Wang et al., "Music Recommender System for Wi-Fi Walkman," Delft University of Technology, 23 pages.

"Anthem—Overview," at <http://www.intercastingcorp.com/platform/anthem>, copyright 2004-2007 Intercasting Corp., printed Jan. 16, 2008, 2 pages.

Gartrell, Charles M., "SocialAware: Context-Aware Multimedia Presentation via Mobile Social Networks," Masters Thesis, submitted to the Faculty of the Graduate School of the University of Colorado, directed by Dr. Richard Han, Department of Computer Science, 2008, found at <http://www.cs.colorado.edu/~rhan/Papers/Mike_Gartrell_CU_MS_thesis-final.pdf>, 42 pages.

"MyStrands Labs: Patent-pending Technologies," at <http://labs.mystrands.com/patents.html>, printed Feb. 7, 2007, 5 pages.

Pampalk, E. and Goto, M., "MusicSun: A New Approach to Artist Recommendation," In Proceedings of the 8th International Conference on Music Information Retrieval (ISMIR 2007), Vienna, Austria, Sep. 23-27, 2007, copyright 2007, Austrian Computer Society (OCG), found at <http://citeseerx.ist.psu.edu/viewdoc/download?doi=10.1.1.69.1403&rep=rep1&type=pdf>, 4 pages.

Wang, J. et al., "Wi-Fi Walkman: A wireless handhold that shares and recommend music on peer-to-peer networks," in Proceedings of Embedded Processors for Multimedia and Communications II, part of the IS&T/SPIE Symposium on Electronic Imaging 2005, Jan. 16-20, 2005, San Jose, California, Proceedings published Mar. 8, 2005, found at <http://citeseerx.ist.psu.edu/viewdoc/download-?doi=10.1.1.108.3459&rep=rep1&type=pdf>, 10 pages.

Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story?track=tothtml, 5 pages.

Cai, Rui et al., "Scalable Music Recommendation by Search," Proc. ACM Multimedia, Augsburg, Germany, Sep. 2007, pp. 1065-1074.

Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.

Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.

Yahoo! Music downloaded archival page from www.archive.org for Jun. 20, 2005, copyright 2005 Yahoo! Inc., 14 pages.

"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.

"Identifying iPod models," http://support.apple.com/kb/HT1353, printed Feb. 24, 2010, 13 pages.

Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.

"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.

"Hulu—About," www.hulu.com/about/product_tour, copyright 2010 Hulu LLC, printed Jun. 15, 2010, 2 pages.

Linder, Brad, "Muziic media player streams audio from YouTube—for now—Download Squad," http://www.downloadsquad.com/2009/03/09/muziic-media-player-streams-audio-from-you..., Mar. 9, 2009, copyright 2003-2009 Weblogs, Inc., printed Jun. 14, 2010, 2 pages.

Nilson, Martin, "id3v2.4.0-frames—ID3.org," http://www.id3.org/id3v2.4.0-frames, Nov. 1, 2000, copyright 1998-2009, printed Jun. 15, 2010, 31 pages.

"Songbird," http://getsongbird.com/, copyright 2010 Songbird, printed Jun. 15, 2010, 2 pages.

"SongReference," http://songreference.com/, copyright 2008, SongReference.com, printed Jun. 15, 2010, 1 page.

"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.

"Instant Messenger—AIM—Instant Message Your Online Buddies for Free—AIM," http://dashboard.aim.com/aim, copyright 2007 AOL LLC, printed Nov. 8, 2007, 6 pages.

"Apple—iPod classic," http://www.apple.com/ipodclassic/, printed Oct. 26, 2007, 1 page.

"betterPropaganda—Free MP3s and music videos.," http://www.betterpropaganda.com/, copyright 2004-2005 betterPropaganda, printed Feb. 7, 2007, 4 pages.

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"Bluetooth.com—Learn," http://www.bluetooth.com/Bluetooth/Learn/, copyright 2007 Bluetooth SIG, Inc., printed Oct. 26, 2007, 1 page.

"ChoiceStream Technology Brief, Review of Personalization Technologies: Collaborative Filtering vs. ChoiceStream's Attributized Bayesian Choice Modeling," 13 pages.

"The Classic TV Database—Your Home For Classic TV!—www.classic-tv.com," http://www.classic-tv.com, copyright The Classic TV Database—www.classic-tv.com, printed Feb. 7, 2007, 3 pages.

"Digital Tech Life >> Download of the Week," http://www.digitechlife.com/category/download-of-the-week/, printed Feb. 16, 2007, 9 pages.

"MP3 music download website, eMusic," http://www.emusic.com/, copyright 2007 eMusic.com Inc., printed Feb. 7, 2007, 1 page.

"GenieLab::Music Recommendation System," http://web.archive.org/web/20060813000442/http://genielab.com/, copyright 2005 GenieLab, LLC, printed Oct. 26, 2007, 1 page.

"The Daily Barometer—GenieLab.com grants music lovers' wishes," http://media.barometer.orst.edu/home/index.cfm?event=displayArticlePrinterFriendly&uSt..., copyright 2007 The Daily Barometer, printed Feb. 16, 2007, 2 pages.

"Gracenote Playlist," Revised Dec. 29, 2005, 2 pages.

"Gracenote Playlist Plus," Revised Dec. 29, 2005, 2 pages.

"Gracenote," http://www.gracenote.com, printed Feb. 7, 2007, 1 page.

"IEEE 802.11—Wikipedia, the free encyclopedia," http://en.wikipedia.org/wiki/IEEE_802.11, printed Oct. 26, 2007, 5 pages.

"iLikeTM—Home," http://www.ilike.com/, copyright 2007 iLike, printed May 17, 2007, 2 pages.

"The Internet Movie Database (IMDb)," http://www.imdb.com/, copyright 1990-2007 Internet Movie Database Inc., printed Feb. 7, 2007, 3 pages.

"Apple—iPod + iTunes," http://www.apple.com/itunes/, copyright 2007 Paramount Pictures, printed Feb. 7, 2007, 2 pages.

"last.fm the social music revolution," 1 page.

"Last.fm—Wikipedia, the free encyclopedia," http://en.wikipedia.org/wiki/Last.fm, printed Aug. 8, 2006, 7 pages.

"LimeWire—Wikipedia, the free encyclopedia," http://en.wikipedia.org/wiki/LimeWire, printed Aug. 8, 2006, 2 pages.

"Liveplasma music, movies, search engine and discovery engine," http://www.liveplasma.com, printed May 17, 2007, 1 page.

"Loomia—Personalized Recommendations for Media, Content and Retail Sites," http://www.loomia.com/, copyright 2006-2007 Loomia Inc., printed Feb. 7, 2007, 2 pages.

"Mercora—Music Search and Internet Radio Network," http://www.mercora.com/overview.asp, copyright 2004-2006 Mercora, Inc., printed Aug. 8, 2006, 1 page.

"Mercora—Music Search and Internet Radio Network," http://www.mercora.com/v6/_front/web.jsp, printed Feb. 7, 2007, 1 page.

"Outlook Home Page—Microsoft Office Online," http://office.microsoft.com/en-us/outlook/default.aspx, copyright 2007 Microsoft Corporation, printed Nov. 8, 2007, 1 page.

"Welcome to the MUSICMATCH Guide," http://www.mmguide.musicmatch.com/, copyright 2001-2004 Musicmatch, Inc., printed Feb. 7, 2007, 1 page.

"Mongomusic.com—The Best Download mp3 Resources and Information. This website is for sale!," http://www.mongomusic.com/, printed May 17, 2007, 2 pages.

"Thunderbird—Reclaim your inbox," http://www.mozilla.com/en-US/thunderbird/, copyright 2005-2007 Mozilla, printed Nov. 8, 2007, 2 pages.

"Take a look at the Future of Mobile Music :: MUSIC GURU," http://www.symbian-freak.com/news/006/02/music_guru.htm, copyright 2005 Symbian freak, printed Feb. 7, 2007, 3 pages.

"Music Recommendations 1.0—MacUpdate," http://www.macupdate.com/info.php/id/19575, printed Feb. 16, 2007, 1 page.

"MusicGremlin," http://www.musicgremlin.com/StaticContent.aspx?id=3, copyright 2005, 2006, 2007 MusicGremlin, Inc., printed Oct. 26, 2007, 1 page.

"MusicIP—The Music Search Engine," http://www.musicip.com/, copyright 2006-2007 MusicIP Corporation, printed Feb. 7, 2007, 1 page.

"Digital Music News," http://www.digitalmusicnews.com/results?title=musicstrands, copyright 2003-6 Digital Music News, printed Aug. 8, 2006, 5 pages.

"Musicstrand.com Because Music is Social," copyright 2006 MusicStrands, Inc., 2 pages.

"MyStrands for Windows 0.7.3 Beta," copyright 2002-2006 ShareApple.com networks, printed Jul. 16, 2007, 3 pages.

"MyStrands for Windows Change Log," http://www.mystrands.com/mystrands/windows/changelog.vm, printed Jul. 16, 2007, 6 pages.

"MyStrands Download," http://www.mystrands.com/overview.vm, printed Feb. 7, 2007, 3 pages.

"Napster—All the Music You Want," http://www.napster.com/using_napster/all_the_music_you_want.html, copyright 2003-2006 Napster, LLC, printed Feb. 7, 2007, 2 pages.

"Try Napster free for 7 Days—Play and download music without paying per song.," http://www.napster.com/choose/index.html, copyright 2003-2007 Napster, LLC, printed Feb. 7, 2007, 1 page.

"FAQ," http://blog.pandora.com/faq/, copyright 2005-2006 Pandora Media, Inc., printed Aug. 8, 2006, 20 pages.

"Pandora Internet Radio—Find New Music, Listen to Free Web Radio," http://www.pandora.com/, copyright 2005-2007 Pandora Media, Inc., printed Feb. 7, 2007, 1 page.

"Pandora Radio—Listen to Free Internet Radio, Find New Music," http://www.pandora.com/mgp, copyright 2005-2007 Pandora Media, Inc., printed Oct. 26, 2007, 1 page.

"RYM FAQ—Rate Your Music," http://rateyourmusic.com/faq/, copyright 2000-2007 rateyourmusic.com, printed Nov. 8, 2007, 14 pages.

"Rhapsody—Full-length music, videos and more—Free," http://www.rhapsody.com/welcome.html, copyright 2001-2007 Listen.com, printed Feb. 7, 2007, 1 page.

Badrul M. Sarwar et al., "Recommender Systems for Large-scale E-Commerce: Scalable Neighborhood Formation Using Clustering," 2002, 6 pages.

"Soundflavor," http://www.soundflavor.com/, copyright 2003-2007 Soundflavor, Inc., printed Feb. 7, 2007, 1 page.

"That canadian girl >> Blog Archive >> GenieLab," http://www.thatcanadiangirl.co.uk/blog/2005/02/22/genielab/, copyright 2007 Vero Pepperrell, printed Feb. 16, 2007, 3 pages.

"Trillian (software)—Wikipedia, the free encyclopedia," http://en.wikipedia.org/wiki/Trillian_(instant_messenger), printed Nov. 8, 2007, 11 pages.

"Babulous :: Keep it loud," http://www.babulous.com/home.jhtml, copyright 2009 Babulous Inc., printed Mar. 26, 2009, 2 pages.

Jennifer Golbeck, "Trust and Nuanced Profile Similarity in Online Social Networks," available from http://www.cs.umd.edu/~golbeck/publications.shtml, 2008, 30 pages.

"MixxMaker: The Mix Tape Goes Online—AppScout," http://www.appscout.com/2008/01/mixxmaker_the_mixtape_goes_onl_1.php, copyright 1996-2009 Ziff Davis Publishing Holdings Inc., printed Aug. 3, 2009, 3 pages.

"Tour's Profile," http://mog.com/Tour, copyright 2006-2009 Mog Inc., printed Aug. 3, 2009, 11 pages.

"Ringo: Social Information Filtering for Music Recommendation," http://jolomo.net/ringo.html, printed Aug. 3, 2009, 1 page.

"About uPlayMe," copyright 2008 uPlayMe, Inc., 4 pages.

"Collect everything you listen to and watch in one place, and effortlessly share them with your friends.," copyright 2008 uPlayMe, Inc., 1 page.

\* cited by examiner

| Title | Time | Artist | Album | Genre | Year | Score | Received | Recommender |
|---|---|---|---|---|---|---|---|---|
| The Suite | 3:01 | Basil Poledouris | For The Love Of Th... | Soundtrack | 1999 | | 3/15/07 1:01 PM | Self |
| I See You In A Different Light | 4:25 | Chante Moore & J... | For The Love Of Th... | Soundtrack | 1999 | | 3/15/07 1:00 PM | Self |
| Just One Breath | 3:18 | Mulberry Lane | For The Love Of Th... | Soundtrack | 1999 | | 3/15/07 1:00 PM | Self |
| Something So Right | 4:11 | Trisha Yearwood | For The Love Of Th... | Soundtrack | 1999 | | 3/15/07 1:00 PM | Self |
| Lover Man | 4:29 | Kami Lyle | For The Love Of Th... | Soundtrack | 1999 | | 3/15/07 12:59 PM | Self |
| Reelin' In The Years | 4:35 | Steely Dan | For The Love Of Th... | Soundtrack | 1999 | | 3/15/07 12:59 PM | Self |
| Paint It Black | 3:34 | Jonny Lang | For The Love Of Th... | Soundtrack | 1999 | | 3/15/07 12:58 PM | Self |
| The Only One | 3:53 | Roy Orbison | For The Love Of Th... | Soundtrack | 1999 | | 3/15/07 12:58 PM | Self |
| Loving You Makes Me a Bet... | 3:32 | Vince Gill | For The Love Of Th... | Soundtrack | 1999 | | 3/15/07 12:57 PM | Self |
| Baby Love | 4:16 | Joan Osborne | For The Love Of Th... | Soundtrack | 1999 | | 3/15/07 12:57 PM | Self |
| For The Love Of The Game | 3:53 | Semisonic | For The Love Of Th... | Soundtrack | 1999 | | 3/15/07 12:56 PM | Self |
| Come Around | 3:54 | Kim Richey | For The Love Of Th... | Soundtrack | 1999 | | 3/15/07 12:56 PM | Self |
| The Fun Of Your Love | 3:57 | Jennifer Day | For The Love Of Th... | Soundtrack | 1999 | | 3/15/07 12:55 PM | Self |
| Hope | 4:04 | Shaggy | For The Love Of Th... | Soundtrack | 1999 | | 3/15/07 12:55 PM | Self |
| Summer Wind | 2:55 | Lyle Lovett | For The Love Of Th... | Soundtrack | 1999 | | 3/15/07 12:54 PM | Self |
| Comfortably Numb [Live] | 4:44 | Van Morrison | Van Morrison At Th... | Soundtrack | 1990 | | 3/15/07 12:53 PM | Self |
| Real Real Gone | 3:42 | Van Morrison | Van Morrison At Th... | Soundtrack | 1990 | | 3/15/07 9:11 PM | Self |
| Days Like This | 3:15 | Van Morrison | Van Morrison At Th... | Soundtrack | 1990 | | 3/15/07 9:11 PM | Self |
| The Memory Of Trees | 4:19 | Enya | Paint The Sky With... | New Age | 1995 | | 3/15/07 9:08 PM | Self |
| On My Way Home | 3:38 | Enya | Paint The Sky With... | New Age | 1995 | | 3/15/07 8:50 PM | Self |
| Marble Halls | 3:55 | Enya | Paint The Sky With... | New Age | 1995 | | 3/15/07 8:49 PM | Self |

Draw My Music From: 90's Music

FIG. 10

Thematic Listening Session Invitation

Gary Simmons has invited you to a Thematic Listening Session entitled "Billboard Top Hits of the 1980s". The parameters for this session include:

Genre = Rock or Pop
Year >= 1980 and Year < 1990

Would you like to join the session?

[Accept]  [Decline]

*FIG. 12*

FIG. 13

SYSTEM AND METHOD FOR CREATING THEMATIC LISTENING EXPERIENCES IN A NETWORKED PEER MEDIA RECOMMENDATION ENVIRONMENT

RELATED APPLICATIONS

This application claims the benefit of provisional patent application Ser. No. 61/149,216, filed Feb. 2, 2009, the disclosure of which is hereby incorporated by reference in its entirety.

FIELD OF THE INVENTION

The present invention relates to media recommendations and more particularly relates to a thematic playback session in a Peer-to-Peer (P2P) media recommendation system.

BACKGROUND

In recent years, there has been an enormous increase in the amount of digital media, such as music, available online. Services such as Apple's iTunes enable users to legally purchase and download music. Other services such as RealNetwork's Rhapsody provide access to millions of songs for a monthly subscription fee. As a result, music has become much more accessible to listeners worldwide. However, the increased accessibility of music has only heightened a long-standing problem for the music industry, which is namely the issue of linking audiophiles with new music that matches their listening preferences.

Many companies, technologies, and approaches have emerged to address this issue of music recommendation. Some companies have taken an analytical approach. They review various attributes of a song, such as melody, harmony, lyrics, orchestration, vocal character, and the like, and assign a rating to each attribute. The ratings for each attribute are then assembled to create a holistic classification for the song that is then used by a recommendation engine. The recommendation engine typically requires that the user first identify a song that he or she likes. The recommendation engine then suggests other songs with similar attributes. Companies using this type of approach include Pandora (http://www.pandora.com), MusicIP (http://www.musicip.com), and MongoMusic (purchased by Microsoft in 2000).

Other companies take a communal approach. They make recommendations based on the collective wisdom of a group of users with similar musical tastes. These solutions first profile the listening habits of a particular user and then search similar profiles of other users to determine recommendations. Profiles are generally created in a variety of ways such as looking at a user's complete collection, the playcounts of the user's songs, the user's favorite playlists, and the like. Companies using this technology include Last.fm (http://www-.last.fm), Music Strands (http://www.musicstrands.com), betterPropaganda (http://www.betterpropaganda.com), Loomia (http://www.loomia.com), eMusic (http://www.emusic.com), musicmatch (http://www.mmguide.musicmatch.com), genielab (http://genielab.com/), upto11 (http://www.upto11.net/), Napster (http://www.napster.com), and iTunes (http://www.itunes.com) with its celebrity playlists.

The problem with these traditional recommendation systems is that they fail to consider peer influences. For example, the music that a particular teenager listens to may be highly influenced by the music listened to by a group of the teenager's peers, such as his or her friends. As such, there is a need for a music recommendation system and method that recommends music to a user based on the listening habits of a peer group.

SUMMARY

The present disclosure relates to providing a thematic playback experience in a Peer-to-Peer (P2P) media recommendation system. In one embodiment, a first peer device and a number of second peer devices in the P2P media recommendation system participate in a thematic playback session defined by one or more thematic parameters. The first peer device initializes a thematic playlist, or thematic playback queue, for a first peer user at the first peer device for the thematic playback session. The thematic playlist for the first peer user is initialized with a number of media items satisfying the one or more thematic parameters defining the thematic playback session. During the thematic playback session, the first peer device selects a media item to play from the thematic playlist for the first peer user and begins playback of the selected media item. During playback of the selected media item, the first peer device receives recommendations for media items selected and played by one or more of the second peer devices from corresponding thematic playlists. Upon receiving the recommendations, the first peer device updates the thematic playlist of the first peer user for the thematic playback session to include the media items identified by the recommendations. After playback of a predetermined amount of the selected media item at the first peer device, the first peer device sends a recommendation for the selected media item to the second peer devices participating in the thematic playback session. Once playback of the selected media item at the first peer device is complete, the first peer device begins playback of a next media item from the thematic playlist of the first peer user. This process continues until the first peer device exits the thematic playback session and/or the thematic playback session is terminated.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 1:
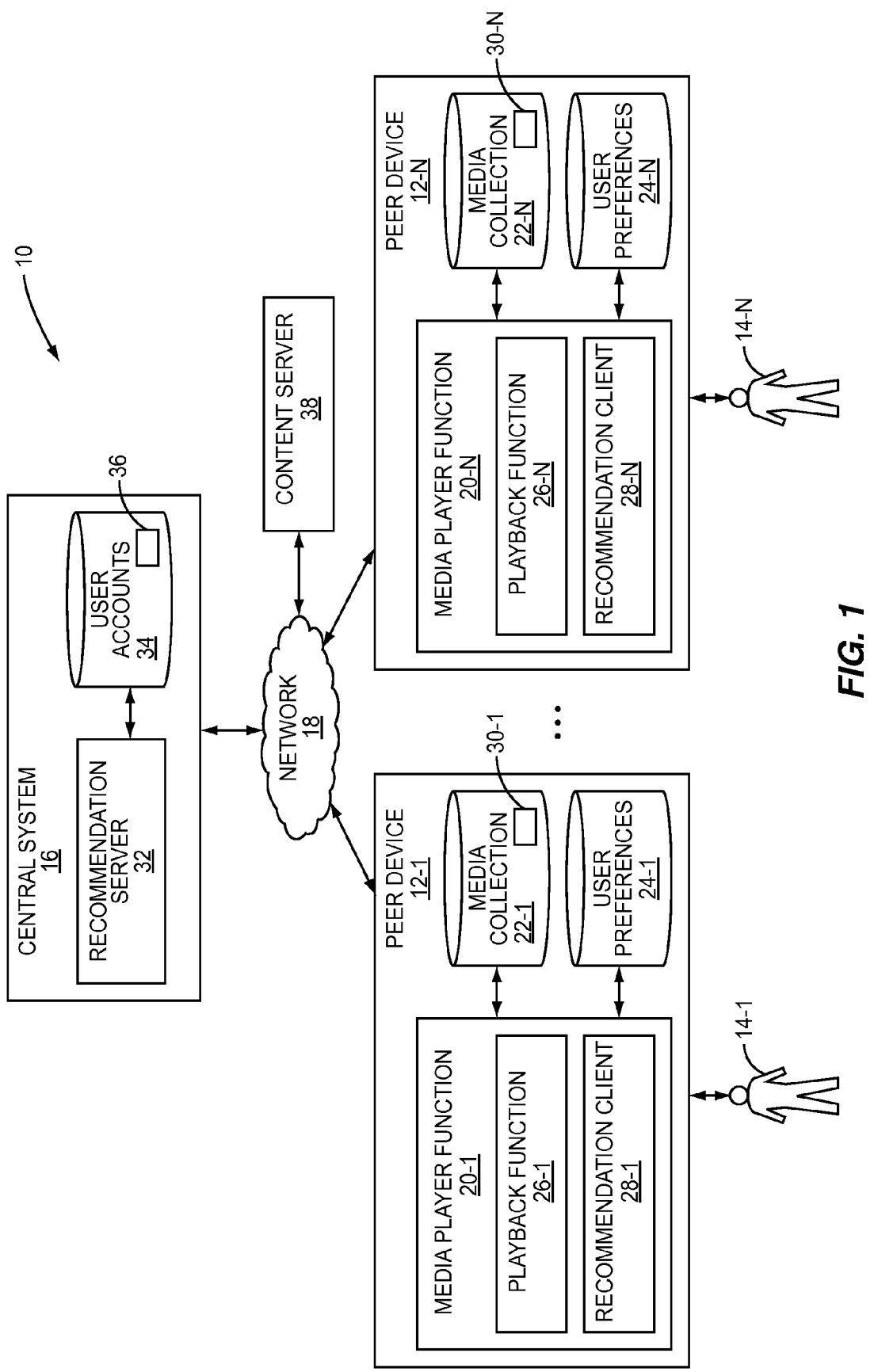
FIG. 1 illustrates a Peer-to-Peer (P2P) recommendation system in which a thematic playback session can be implemented according to one embodiment of this disclosure.
Figure 5A:
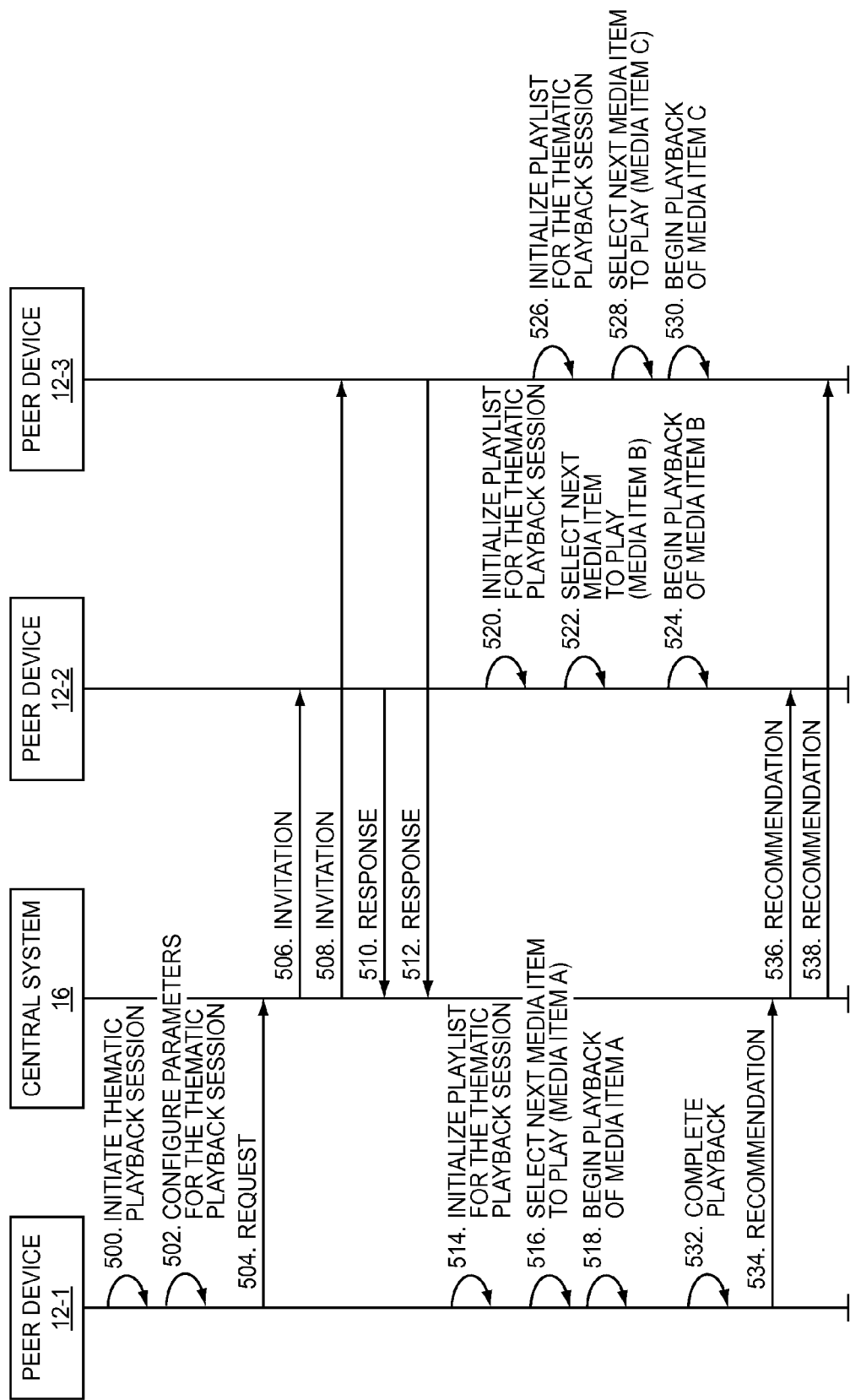
Figure 5B:
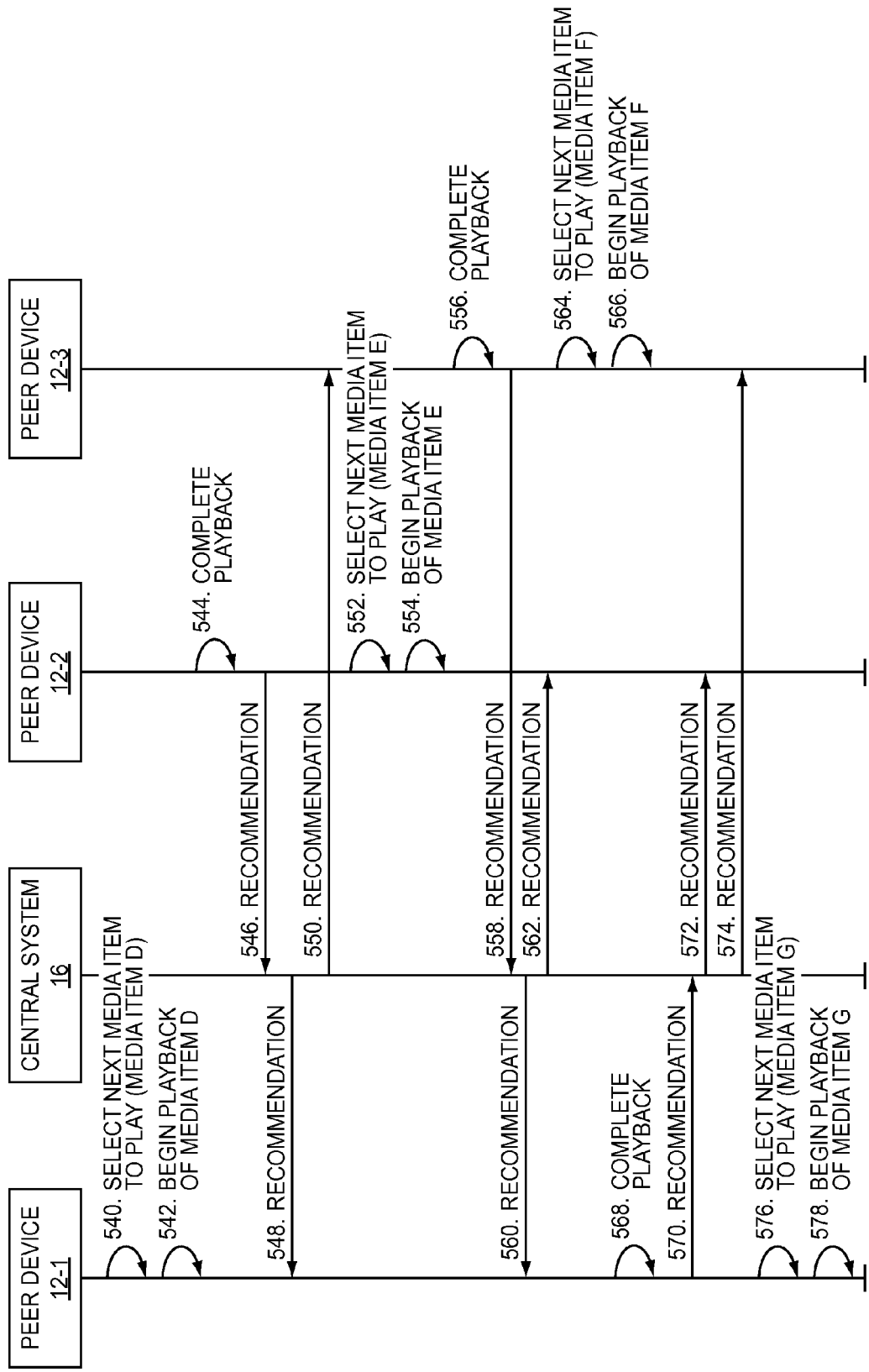
Figure 5C:
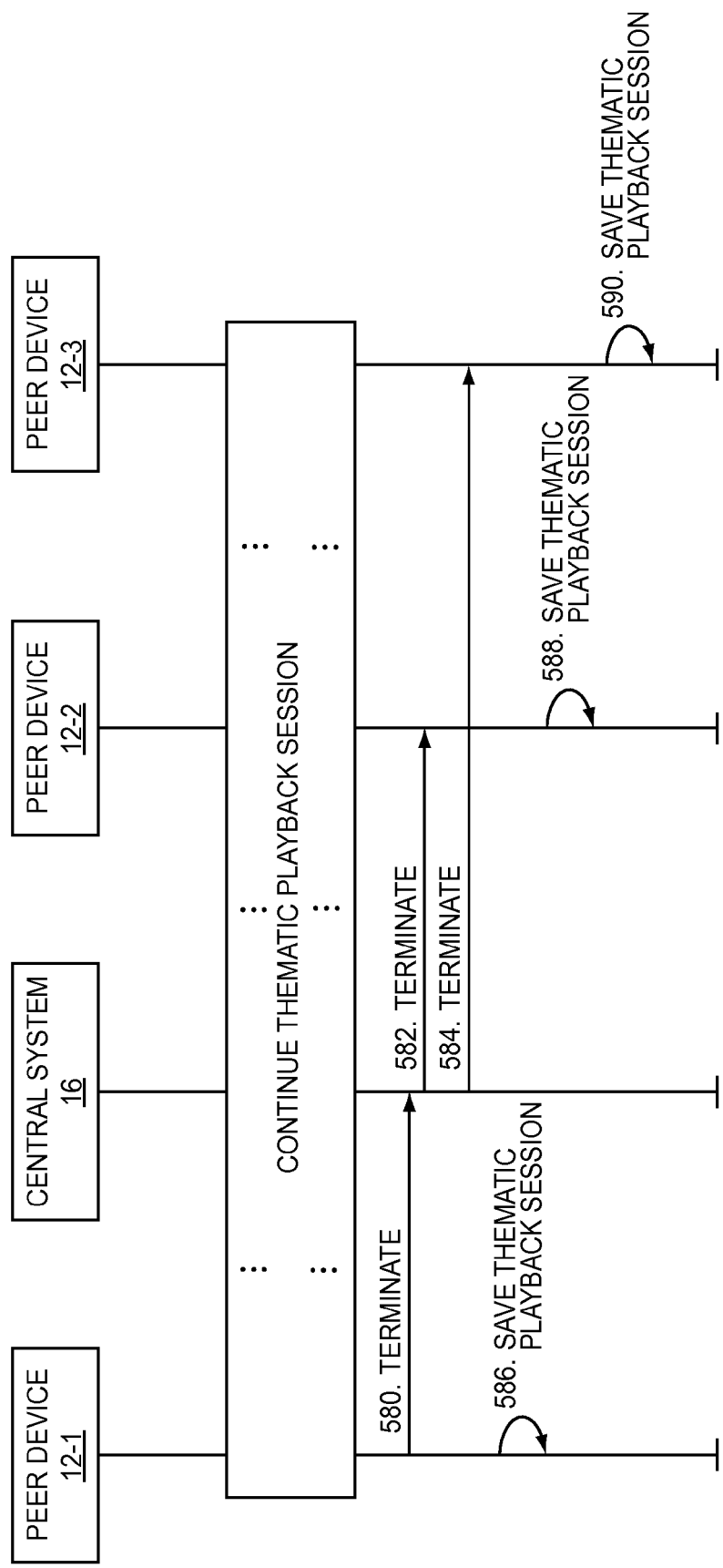
Figure 6A:
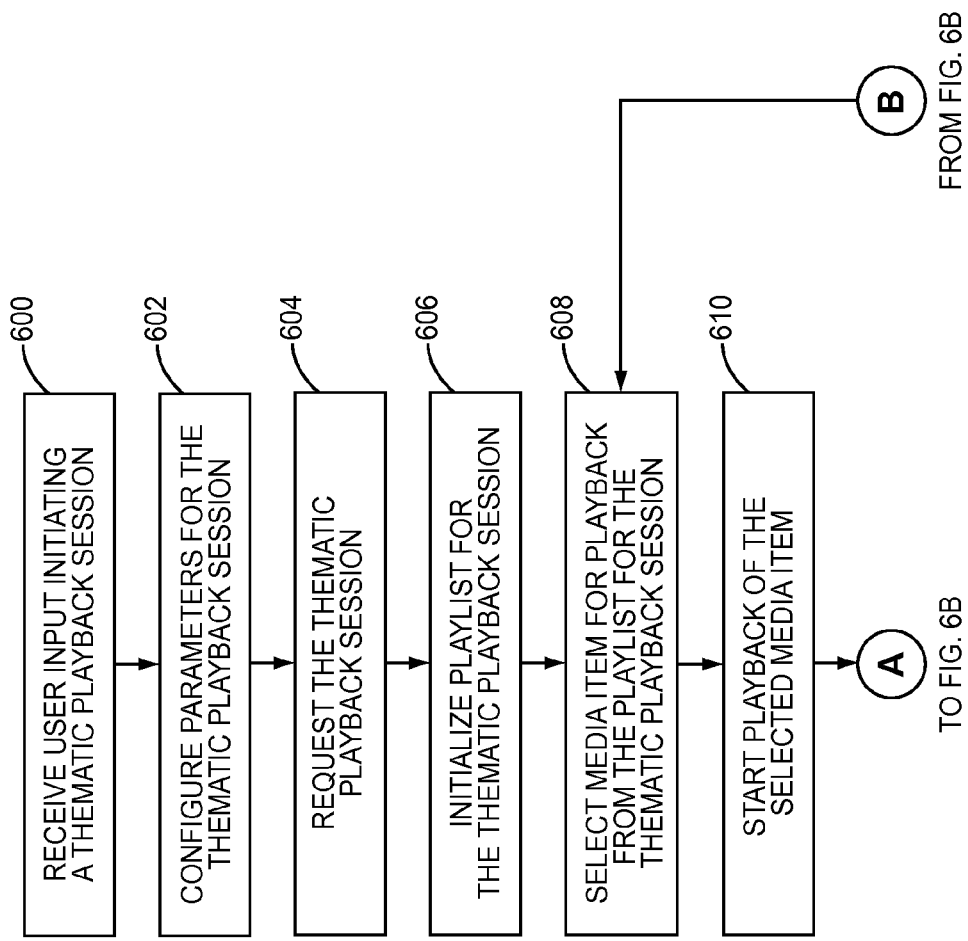
Figure 6B:
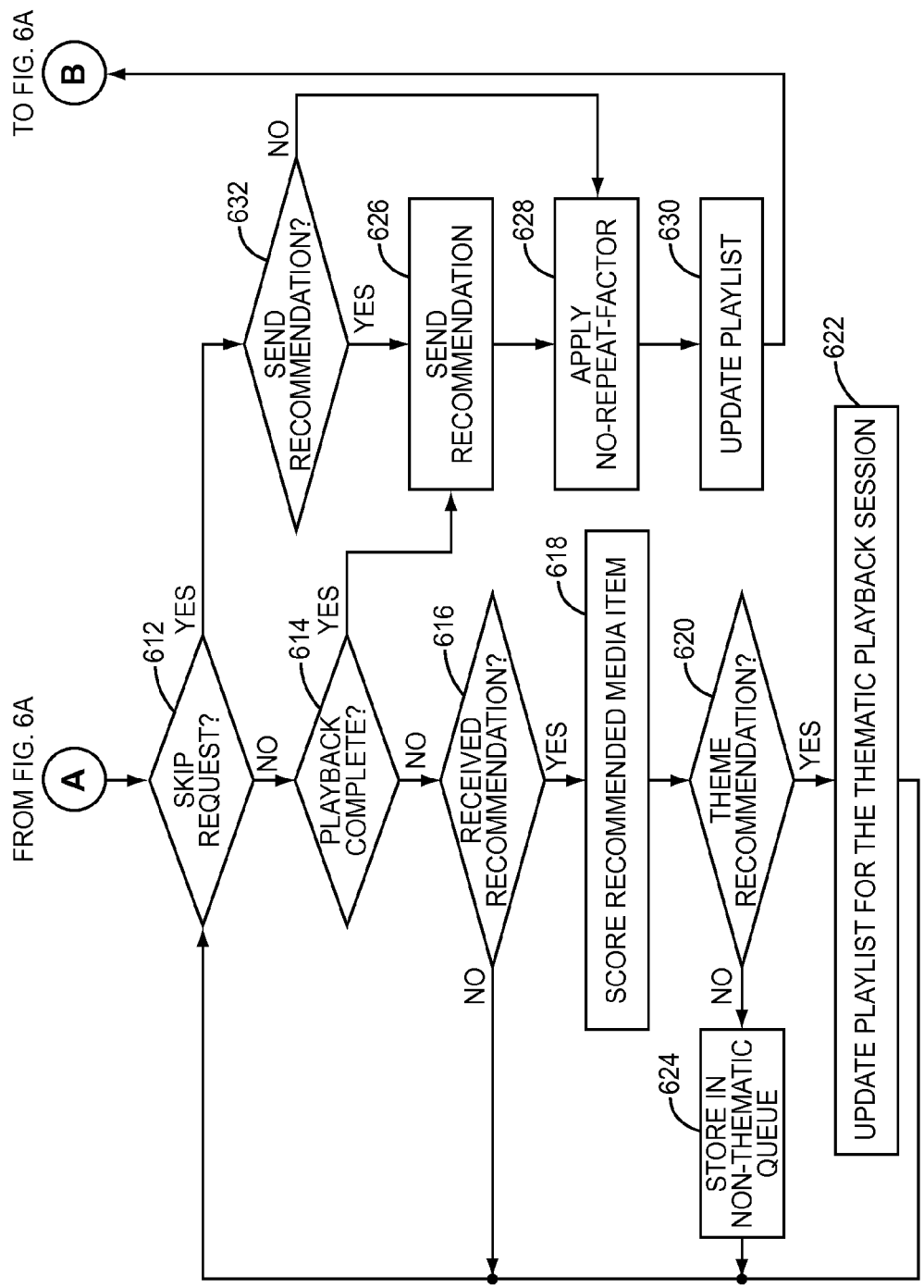
Figure 7:
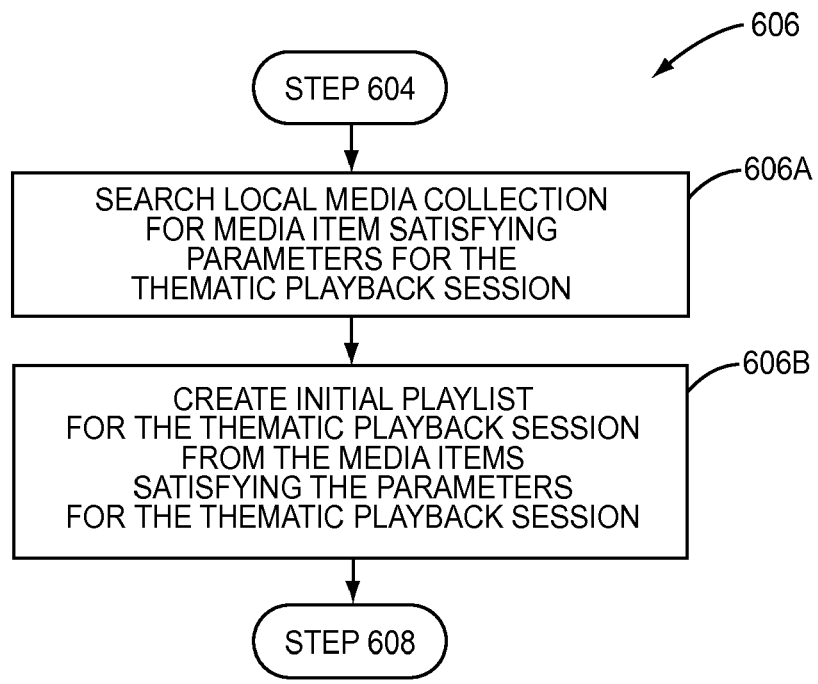
Figure 8:
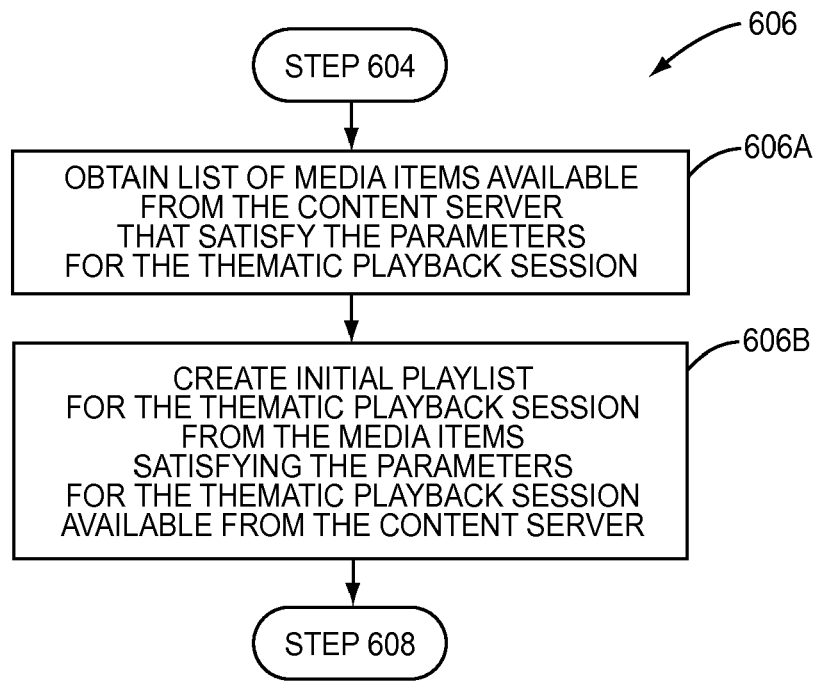
Figure 9:
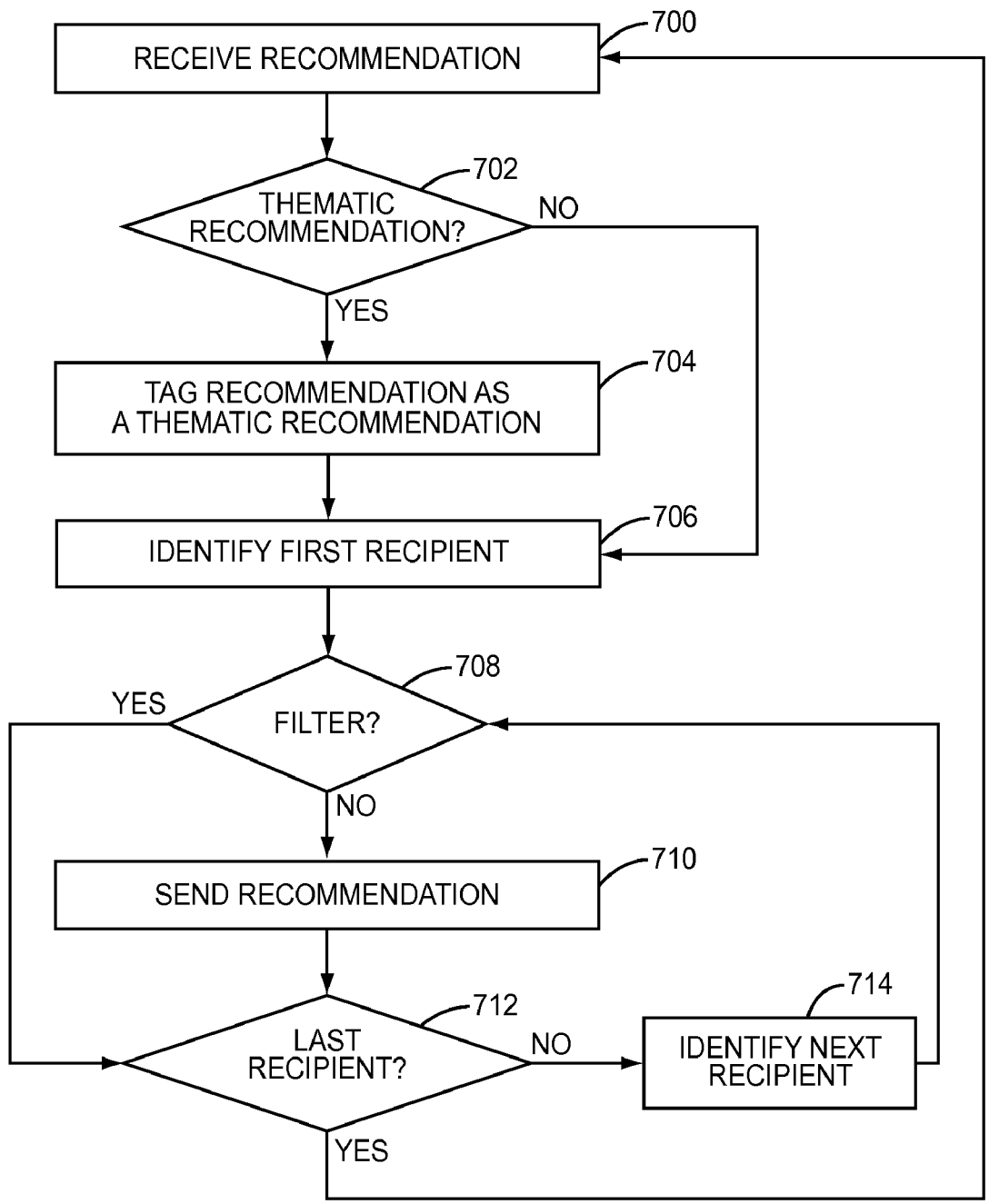
Figure 11:
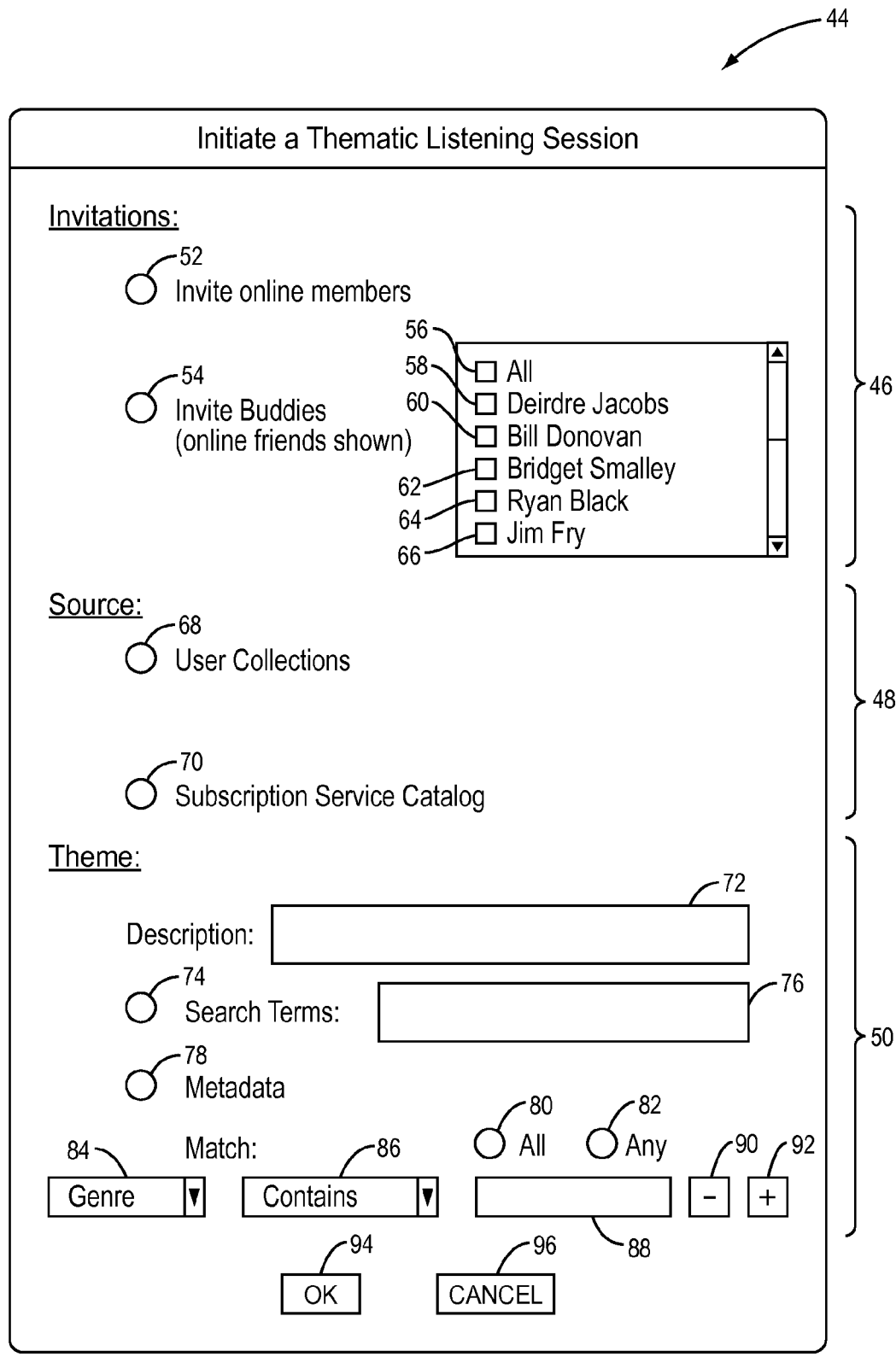
Figure 14A:
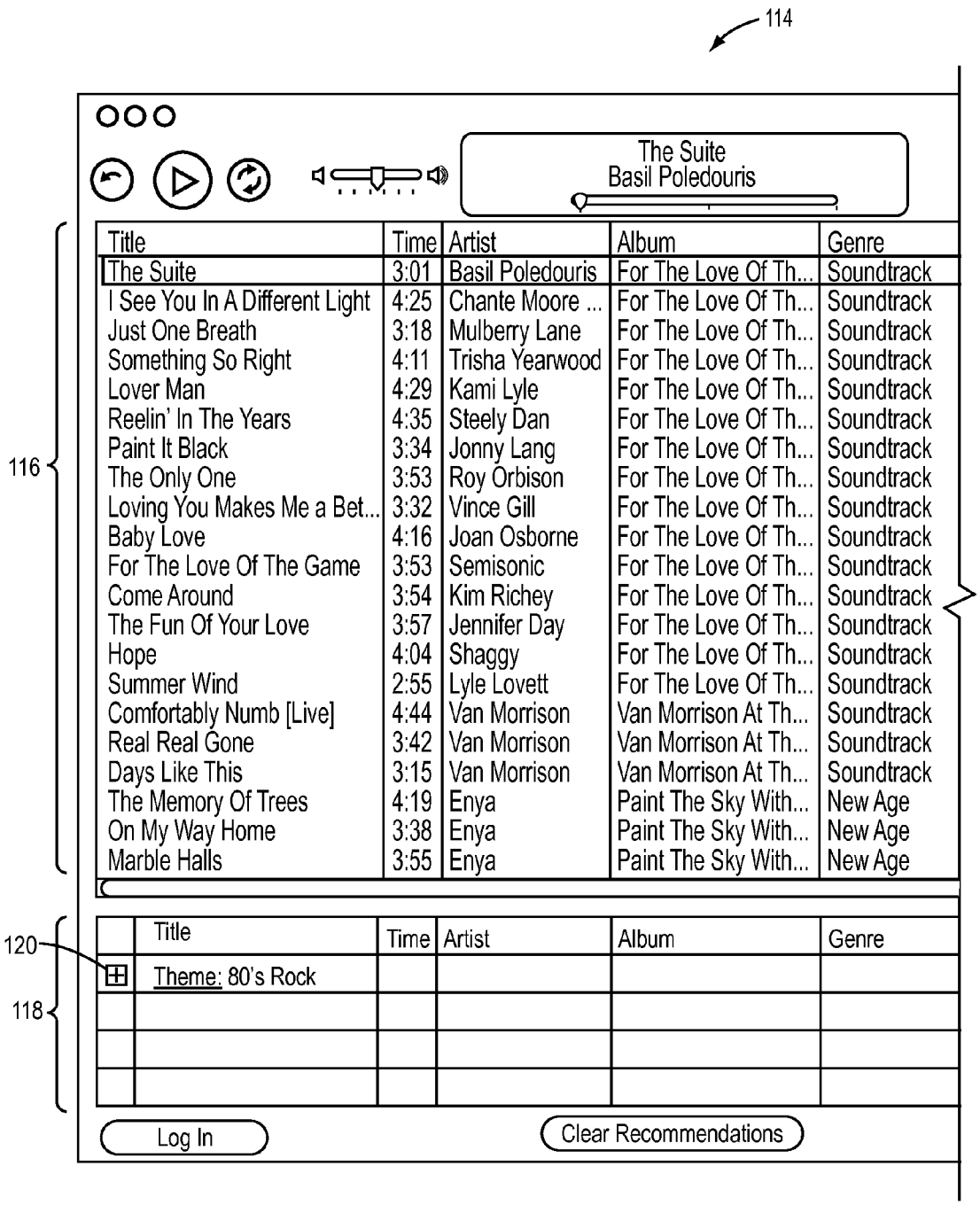
Figure 14B:
Figure 15:
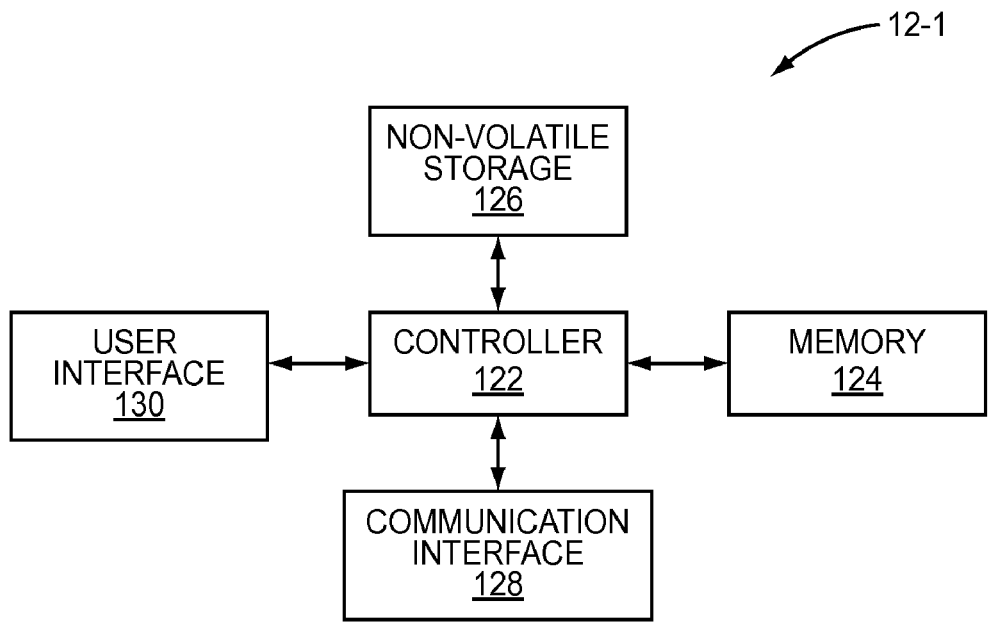
Figure 16:
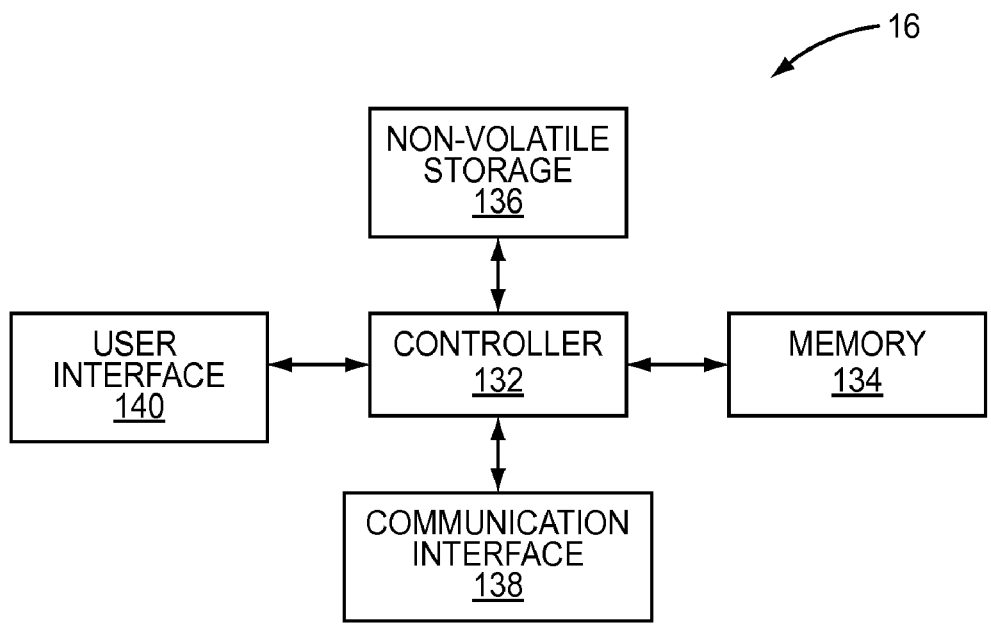

FIGS. 5A, 5B, and 5C illustrate the operation of the P2P recommendation system of FIG. 1 to provide a thematic playback session according to one embodiment of this disclosure;

FIGS. 6A and 6B are a flow chart illustrating the operation of one of the recommendation clients of FIG. 1 to provide a thematic playback session according to one embodiment of this disclosure;

FIG. 7 illustrates the step of initiating the thematic playlist of FIGS. 6A and 6B in more detail according to one embodiment of this disclosure;

FIG. 8 illustrates the step of initiating the thematic playlist of FIGS. 6A and 6B in more detail according to another embodiment of this disclosure;

FIG. 9 is a flow chart illustrating the operation of the recommendation server of FIG. 1 during a thematic playback session according to one embodiment of this disclosure;

FIG. 10 is an exemplary Graphical User Interface (GUI) enabling a user to initiate a thematic playback session according to one embodiment of this disclosure;

FIG. 11 is an exemplary GUI enabling a user to select configurations for a thematic playback session including parameters defining the thematic playback session;

FIG. 12 illustrates an exemplary invitation sent to a user to invite the user to join a thematic playback session according to one embodiment of this disclosure;

Figure 13:
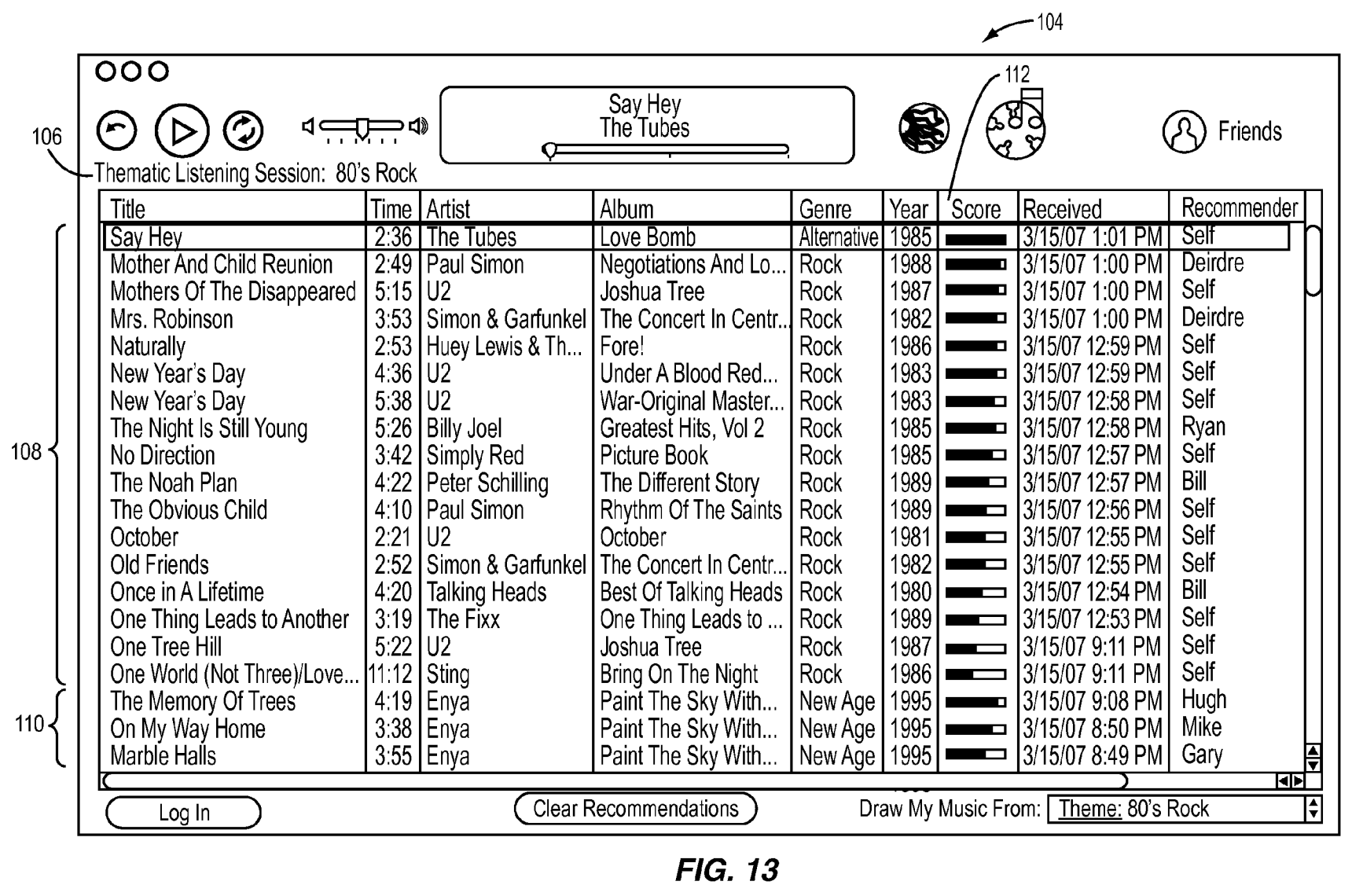

FIG. 13 is an exemplary GUI presented to a user during a thematic playback session according to one embodiment of this disclosure;

FIGS. 14A and 14B are an exemplary GUI for enabling a user to access a saved thematic playback session after the thematic playback session has ended according to one embodiment of this disclosure;

FIG. 15 is a block diagram of one of the peer devices of FIG. 1 according to one embodiment of this disclosure; and FIG. 16 is a block diagram of the central system of FIG. 1 according to one embodiment of this disclosure.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates of a Peer-to-Peer (P2P) media recommendation system 10 according to one embodiment of this disclosure. As illustrated, the system 10 includes a number of peer devices 12-1 through 12-N having associated users 14-1 through 14-N. The peer devices 12-1 through 12-N are connected to a central system 16 via a network 18. The network 18 may be a Local Area Network (LAN), a Metropolitan Area Network (MAN), a Wide Area Network (WAN), or any combination of one or more LANs, one or more MANs, and/or one or more WANs. Further, the network 18 may include wired components, wireless components, or both wired and wireless components. As an example, the network 18 may be the Internet, where each of the peer devices 12-1 through 12-N is connected to the network 18 via a wired connection (e.g., an Ethernet connection), a local wireless connection (e.g., an IEEE 802.11x connection to a wireless access node), a cellular communication connection (e.g., Global System for Mobile communications (GSM), Wideband Code Division Multiple Access (W-CDMA), Worldwide Interoperability for Microwave Access (WiMAX)), or the like.

Each of the peer devices 12-1 through 12-N is a physical device such as, for example, a personal computer, a mobile smart phone such as an Apple® iPhone, a portable media player such as an Apple® iPod Touch®, or the like. The peer device 12-1 includes a media player function 20-1, a media collection 22-1, and user preferences 24-1. The media player function 20-1 may be implemented in software, hardware, or a combination thereof. The media player function 20-1 includes a playback function 26-1 that operates to provide playback of media items such as, but not limited to, media items in the media collection 22-1. In addition, the media player function 20-1 includes a recommendation client 28-1 that operates to send, receive, and process media recommendations as described herein. The media collection 22-1 includes a number of media items 30-1 stored by the peer device 12-1. Preferably, the media items 30-1 are songs. However, the present invention is not limited thereto. The media items 30-1 may be audio items such as, but not limited to, songs, audio books, or audio clips or video items such as, but not limited to, video clips, television programs, or movies. In addition, the media collection 22-1 may include audio items, video items, or both audio and video items.

The user preferences 24-1 are stored by the peer device 12-1 and generally include any type of user preferences that may be used to score or otherwise rank media items in a manner that reflects expected desirability of the media items to the user 14-1. For instance, for songs, the user preferences 24-1 may include weights assigned to one or more music genres, weights assigned to one or more time periods such as decades, weights assigned to one or more music artists, weights assigned to one or more of the other users 14-2 through 14-N in the system 10, or the like.

In a similar manner, the peer device 12-N includes a media player function 20-N, a media collection 22-N, and user preferences 24-N. The media player function 20-N may be implemented in software, hardware, or a combination thereof. The media player function 20-N includes a playback function 26-N that operates to provide playback of media items such as, but not limited to, media items in the media collection 22-N. In addition, the media player function 20-N includes a recommendation client 28-N that operates to send, receive, and process media recommendations as described herein. The media collection 22-N includes a number of media items 30-N stored by the peer device 12-N. Preferably, the media items 30-N are songs. However, the present invention is not limited thereto. The media items 30-N may be audio items such as, but not limited to, songs, audio books, or audio clips or video items such as, but not limited to, video clips, television programs, or movies. In addition, the media collection 22-N may include audio items, video items, or both audio and video items.

Lastly, the user preferences 24-N are stored by the peer device 12-N and generally include any type of user preferences that may be used to score or otherwise rank media items in a manner that reflects expected desirability of the media items to the user 14-N. For instance, for songs, the user preferences 24-N may include weights assigned to one or more music genres, weights assigned to one or more time periods such as decades, weights assigned to one or more music artists, weights assigned to one or more of the other users 14-1 through 14-N−1 in the system 10, or the like.

The central system 16 is implemented as one or more physical servers. The central system 16 includes a recommendation server 32, which may be implemented as software, hardware, or a combination thereof within the one or more physical servers forming the central system 16. The recommendation server 32 enables the peer devices 12-1 through 12-N to exchange media recommendations and further enables the peer users 14-1 through 14-N to create and participate in thematic playback sessions according to one embodiment of this disclosure. The central system 16 also includes a user accounts database 34, which includes a user account 36 for each of the users 14-1 through 14-N.

Using the user 14-1 as an example, the user account 36 of the user 14-1 includes a buddy list of the user 14-1. The buddy list of the user 14-1 is a list of other users from the users 14-2 through 14-N in the system 10 to whom the user 14-1 desires to send media recommendations and from whom the user 14-1 desires to receive media recommendations. In an addition or alternatively, the buddy list of the user 14-1 may be stored by the peer device 12-1. The user account 36 of the user 14-1 may also include one or more filtering criteria for the user 14-1 used to filter media recommendations received by the user 14-1. The filtering criteria may be content based criteria, time based criteria, location based criteria, or the like, or any combination thereof. For instance, the filtering criteria may indicate that media recommendations for media items containing explicit content (e.g., profanity) are not to be sent to the peer device 12-1 of the user 14-1. As another example, the filtering criteria may indicate that media recommendations are not to be sent to the peer device 12-1 of the user 14-1 during the hours of 10 am to 2 pm or that media recommendations for media items containing explicit content (e.g., profanity) are not to be sent to the peer device 12-1 of the user 14-1 during the hours of 8 am to 5 pm on Monday through Friday. As a final example, the filtering criteria may indicate that media recommendations are not to be sent to the peer device 12-1 of the user 14-1 when the user 14-1 is at work or that media recommendations for media items containing explicit content (e.g., profanity) are not to be sent to the peer device 12-1 of the user 14-1 when the user 14-1 is at work.

The system 10 may also include a content server 38 connected to the network 18. The content server 38 may be implemented as one or more physical servers and operates to enable the peer devices 12-1 through 12-N to obtain media items and previews of media items. The content server 38 may enable the users 14-1 through 14-N to purchase media items according to an ecommerce model such as or similar to that used by the Apple® iTunes Store®, enable the users 14-1 through 14-N to have unlimited access to media items according to a subscription model such as or similar to that used by Rhapsody® Unlimited, or both. Still further, the content server 38 may enable downloading or streaming of previews of media items on-demand.

Figure 2:
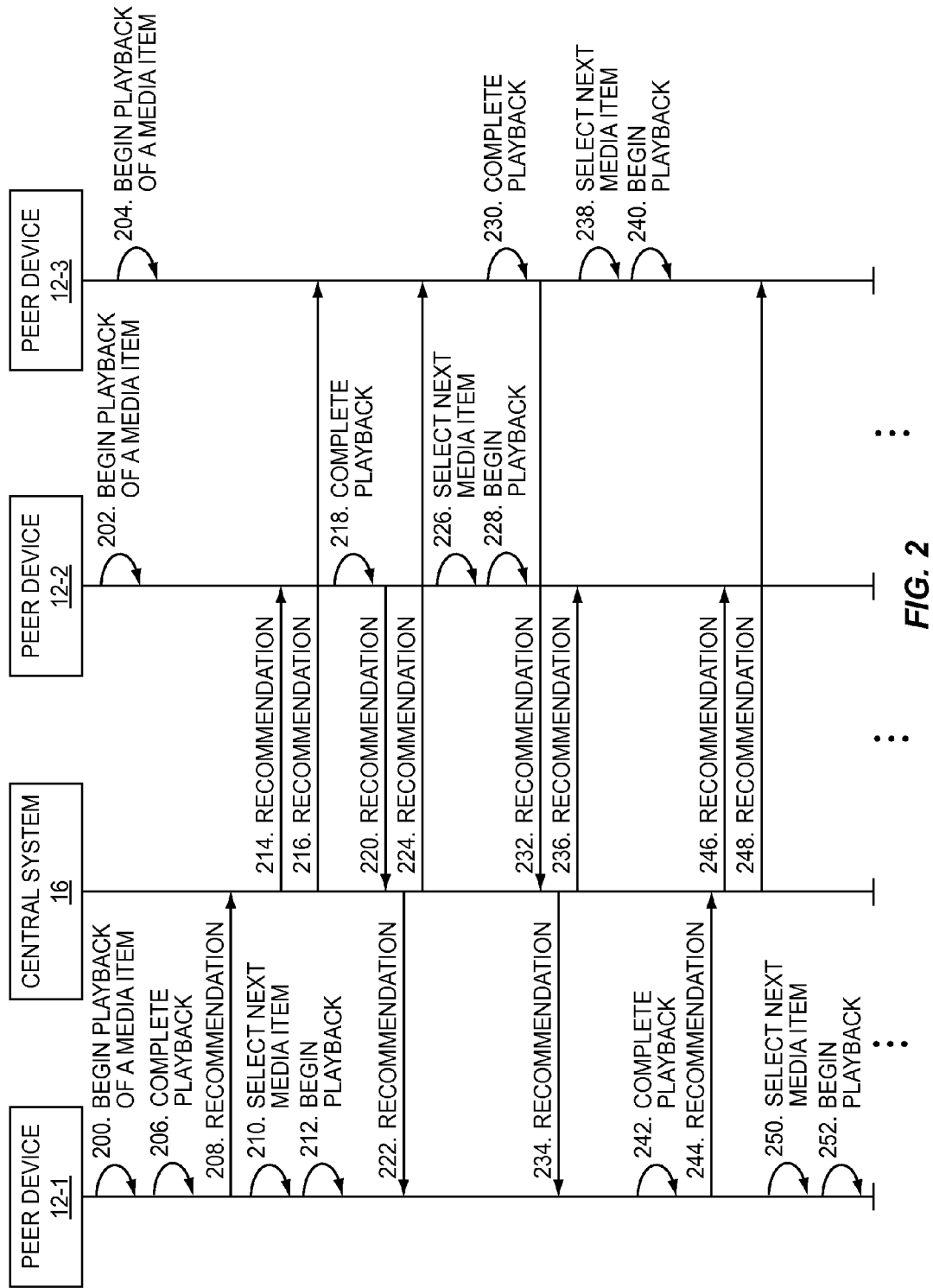
FIG. 2 illustrates the operation of the P2P recommendation system of FIG. 1 to provide a normal playback session according to one embodiment of this disclosure.

Before discussing the operation of the system 10 to provide a thematic playback session, a discussion of a normal mode of operation of the system 10 is beneficial. FIG. 2 illustrates the operation of the system 10 during a normal mode of operation according to one embodiment of this disclosure. First, the peer device 12-1 begins playback of a media item (step 200). At some point before, at the same time as, or after the peer device 12-1 begins playback of the media item, peer devices 12-2 and 12-3 begin playback of media items (steps 202 and 204). In this exemplary embodiment, the peer device 12-1 does not receive any media recommendations while playing the media item. As such, playback of the media item completes (step 206).

At the completion of playback of the media item or at least a predetermined amount of the media item at the peer device 12-1, the recommendation client 28-1 (FIG. 1) of the peer device 12-1 sends a media recommendation for the media item to the recommendation server 32 (FIG. 1) of the central system 16 (step 208), selects a next media item to play (step 210), and begins playback of the next media item (step 212).

The media recommendation sent to the central system 16 includes information identifying the media item played by the peer device 12-1. The information identifying the media item played by the peer device 12-1 may be a Globally Unique Identifier (GUID) of the media item, metadata describing the media item, or the like. For example, for a song, the metadata describing the song may include a title of the song, an artist of the song, an album on which the song was released, a year in which the song was released, or the like.

Upon receiving the media recommendation from the peer device 12-1, the recommendation server 32 of the central system 16 identifies other users listed in the buddy list of the user 14-1 of the peer device 12-1 as recipients of the media recommendation. In this exemplary embodiment, users 14-2 and 14-3 at the peer devices 12-2 and 12-3 are identified as the recipients of the media recommendation. Alternatively, the buddy list may be maintained at the peer device 12-1, and the media recommendation sent by the peer device 12-1 may identify the recipients or the peer device 12-1 may send a separate media recommendation for each recipient.

The recommendation server 32 of the central system 16 sends the media recommendation for the media item played by the peer device 12-1 to the peer devices 12-2 and 12-3 (steps 214 and 216). In one embodiment, the recommendation server 32 may append a reference, such as a Uniform Resource Locator (URL), to the media item at the content server 38 (FIG. 1) to the media recommendation for the media item and/or append a reference to a preview of the media item at the content server 38 to the media recommendation. Alternatively, the media recommendation from the peer device 12-1 may include a reference to the media item at the content server 38, a reference to a preview of the media item at the content server 38, or both.

With respect to the peer device 12-2, during playback of the media item at the peer device 12-2 (which began in step 202), the recommendation client 28-2 of the peer device 12-2 receives the media recommendation for the media item played by the peer device 12-1 via the recommendation server 32 of the central system 16. Upon completing playback of the media item at the peer device 12-2 (step 218), the recommendation client 28-2 of the peer device 12-2 sends a media recommendation for the media item to the recommendation server 32 of the central system 16 (step 220). In the manner described above, the recommendation server 32 of the central system 16 then identifies the users 14-1 and 14-3 of the peer devices 12-1 and 12-3 as the recipients of the media recommendation and sends the media recommendation for the media item played by the peer device 12-2 to the peer devices 12-1 and 12-3 (steps 222 and 224). In addition, the recommendation client 28-2 of the peer device 12-2 selects a next media item to play from a pool of media items including the media item identified by the media recommendation from the peer device 12-1 received by the peer device 12-2 in step 214 and begins playback of the next media item (steps 226 and 228). In addition, the pool of media items may include one or more previously recommended media items, a number of media items from the media collection 22-2 stored at the peer device 12-2, one or more media items available from the content server 38, or any combination thereof.

With respect to the peer device 12-3, during playback of the media item at the peer device 12-3 (which began in step 204), the recommendation client 28-3 of the peer device 12-3 receives the media recommendations for the media items played by the peer devices 12-1 and 12-2 via the recommendation server 32 of the central system 16. Upon completing playback of the media item at the peer device 12-3 (step 230), the recommendation client 28-3 of the peer device 12-3 sends a media recommendation for the media item to the recommendation server 32 of the central system 16 (step 232). In the manner described above, the recommendation server 32 of the central system 16 then identifies the users 14-1 and 14-2 of the peer devices 12-1 and 12-2 as the recipients of the media recommendation and sends the media recommendation for the media item played by the peer device 12-3 to the peer devices 12-1 and 12-2 (steps 234 and 236). In addition, the recommendation client 28-3 of the peer device 12-3 selects a next media item to play from a pool of media items including the media items identified by the media recommendations from the peer devices 12-1 and 12-3 received by the peer device 12-3 in steps 216 and 224 and begins playback of the next media item (steps 238 and 240). In addition, the pool of media items may include one or more previously recommended media items, a number of media items from the media collection 22-3 stored at the peer device 12-3, one or more media items available from the content server 38, or any combination thereof.

Returning to the peer device 12-1, during playback of the media item at the peer device 12-1 (which started in step 212), the recommendation client 28-1 of the peer device 12-1 receives the media recommendations for the media items played by the peer devices 12-2 and 12-3 via the recommendation server 32 of the central system 16. Upon completing playback of the media item at the peer device 12-1 (step 242), the recommendation client 28-1 of the peer device 12-1 sends a media recommendation for the media item to the recommendation server 32 of the central system 16 (step 244). In the manner described above, the recommendation server 32 of the central system 16 then identifies the users 14-2 and 14-3 of the peer devices 12-2 and 12-3 as the recipients of the media recommendation and sends the media recommendation for the media item played by the peer device 12-1 to the peer devices 12-2 and 12-3 (steps 246 and 248). In addition, the recommendation client 28-1 of the peer device 12-1 selects a next media item to play from a pool of media items including the media items identified by the media recommendations from the peer devices 12-2 and 12-3 received by the peer device 12-1 in steps 222 and 234 and begins playback of the next media item (steps 250 and 252). In addition, the pool of media items may include one or more previously recommended media items, a number of media items from the media collection 22-1 stored at the peer device 12-1, one or more media items available from the content server 38, or any combination thereof. From this point, the process continues such that the peer devices 12-1, 12-2, and 12-3 continue to send media recommendations automatically in response to playback of corresponding media items, receive media recommendations, and process the media recommendations to select next media items to play.

Figure 3:
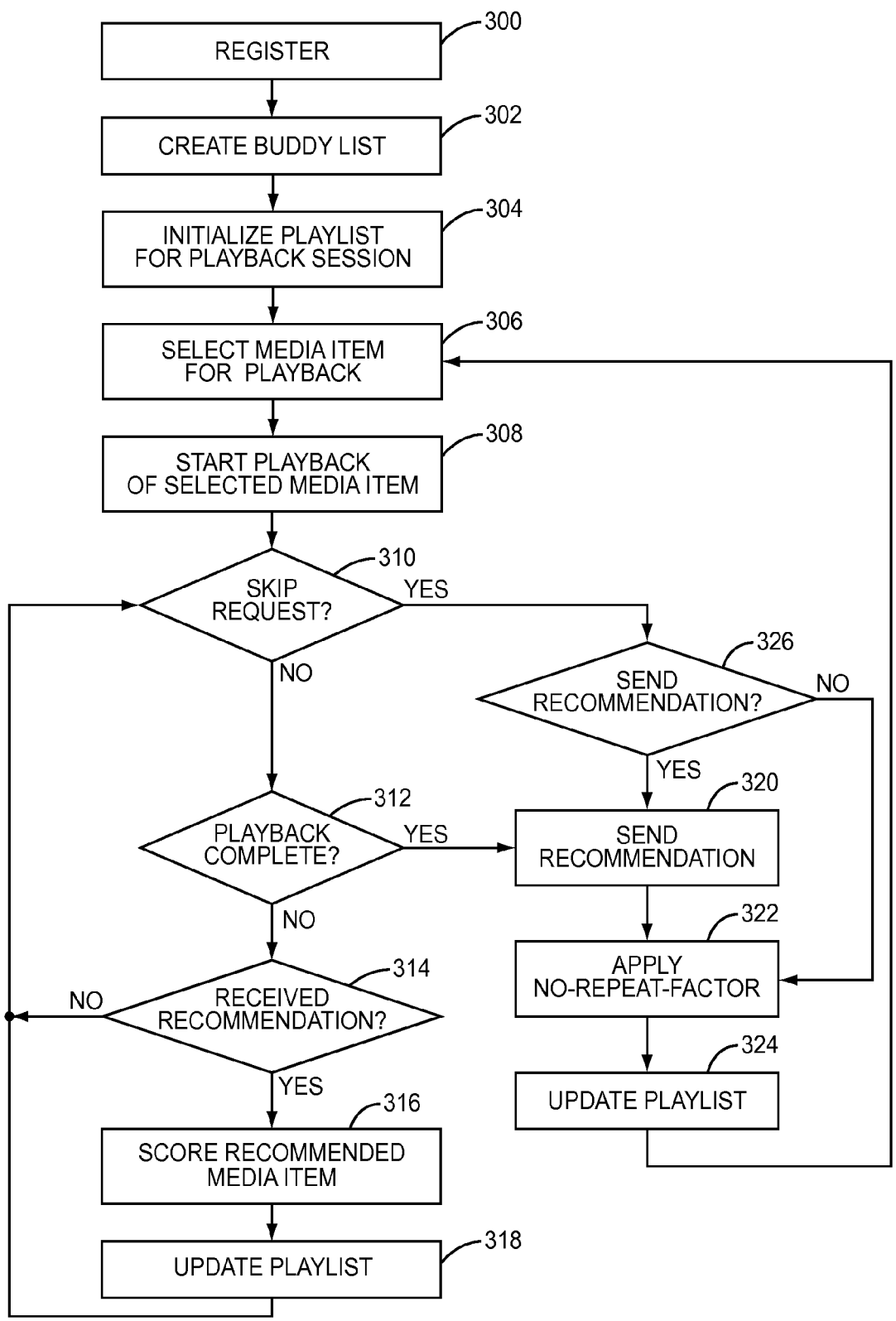
FIG. 3 is a flow chart illustrating the operation of one of the recommendation clients of FIG. 1 to provide a normal playback session according to one embodiment of this disclosure.

FIG. 3 is a flow chart illustrating the operation of the recommendation client 28-1 of the peer device 12-1 in the normal mode of operation according to one embodiment of this disclosure. This discussion is equally applicable to the recommendation clients 28-2 through 28-N of the other peer devices 12-2 through 12-N. First, the recommendation client 28-1 interacts with the recommendation server 32 of the central system 16 to perform a registration process during which the user 14-1 becomes a registered user (step 300). During registration, the user 14-1 may receive a user ID, provide contact information such as an e-mail address, optionally define filtering criteria if desired, or the like. Alternatively, the registration process may be performed via a web page prior to a download process wherein the recommendation client 28-1 or the media player function 20-1 is downloaded to and installed on the peer device 12-1.

Next, the recommendation client 28-1 enables the user 14-1 to create a buddy list (step 302). As discussed above, the buddy list of the user 14-1 is a list of one or more of the other users 14-2 through 14-N in the system 10 to which the user 14-1 desires to send recommendations and from which the user 14-1 desires to receive recommendations. Note that the user 14-1 may add or remove a user from his buddy list at any time. The recommendation client 28-1 then initializes a playlist, or playback queue, for a playback session (step 304). The manner in which the playlist for the playback session is initialized may vary depending on the particular embodiment. In one embodiment, the playlist for the playback session is initialized with all of the media items 30-1 in the media collection 22-1 stored at the peer device 12-1. In another embodiment, the playlist for the playback session is initialized with a subset of the media items 30-1 in the media collection 22-1 stored at the peer device 12-1. The subset of the media items 30-1 may be identified by one or more pre-existing playlists. Alternatively, the subset of the media items 30-1 may be automatically selected by first scoring the media items 30-1 in the media collection 22-1 based on the user preferences 24-1 of the user 14-1. Then, either a predetermined number of the highest scored media items 30-1 or the media items 30-1 scored greater than a predetermined threshold score may be automatically selected as the subset of the media items 30-1 for the playlist for the playback session.

In another embodiment, the playlist for the playback session may be initialized by automatically or manually selecting one or more media items from a catalog of media items available from the content server 38. This may be particularly beneficial for a subscription based model where, for a subscription fee, the user 14-1 has access to all media items in the catalog of media items available from the content server 38. In yet another embodiment, the recommendation client 28-1 may initialize the playlist for the playback session by enabling the user 14-1 to select one or more media items from the media collection 22-1 stored at the peer device 12-1, one or more media items available from the content server 38, or both.

Next, the recommendation client 28-1 selects a next media item to play from the playlist for the playback session (step 306). In the preferred embodiment, the media items in the playlist for the playback session are scored based on the user preferences 24-1 of the user 14-1, and the playlist is sorted based on the scores of the media items. As such, media items having the highest scores are located at the top of the playlist. The recommendation client 28-1 may select a first media item in the playlist (i.e., the highest scored media item in the playlist) as the next media item to play.

Once the next media item to play is selected, the recommendation client 28-1 interacts with the playback function 26-1 to begin playback of the selected media item (step 308). In this embodiment, during playback of the selected media item, the recommendation client 28-1 then determines whether a request to skip to the selected media item, which is referred to herein as a skip request, has been received from the user 14-1 (step 310). If a skip request has not been received, the recommendation client 28-1 determines whether playback of the selected media item is complete (step 312). If playback is not complete, the recommendation client 28-1 determines whether a media recommendation has been received from the recommendation server 32 of the central system 16 (step 314). If a media recommendation has not been received, the process returns to step 310 and is repeated. If a media recommendation has been received, the recommendation client 28-1 scores the recommended media item identified by the media recommendation based on the user preferences 24-1 of the user 14-1 (step 316). For a more detailed discussion of an exemplary scoring process, the interested reader is directed to U.S. Patent Application Publication No. 2008/0016205, entitled P2P NETWORK FOR PROVIDING REAL TIME MEDIA RECOMMENDATIONS, which was filed on Jul. 11, 2006 and published on Jan. 17, 2008, which is hereby incorporated herein by reference in its entirety.

The recommendation client 28-1 then updates the playlist for the playback session to include the recommended media item (step 318). More specifically, in one embodiment, the playlist for the playback session is sorted based on score, and the recommended media item is inserted into the playlist according to the score of the recommended media item. Note that, in one embodiment, if the recommended media item is not already stored in the media collection 22-1 at the peer device 12-1, in addition to inserting the recommended media item into the playlist, the recommendation client 28-1 may insert the recommended media item into a download queue. In one embodiment, media items in the download queue scored above a first threshold score are automatically downloaded from the content server 38. Previews of media items in the download queue that are scored less than the first threshold score but greater than a second threshold score may be downloaded and played in place of the complete media item. Neither a preview nor the complete media item may be downloaded for media items in the download queue that are scored less than the second threshold score. Once the playlist is updated, the process returns to step 310 and is repeated.

Returning to step 312, if playback of the selected media item is complete, the recommendation client 28-1 sends a media recommendation for the selected media item (step 320). Playback of the selected media item may be complete when the entire media item has been played or when a playback has reached a predetermined point in the media item such as, for example, a predetermined number of seconds from the end of playback of the selected media item. As discussed above, in the exemplary system 10 of FIG. 1, the recommendation client 28-1 sends the media recommendation for the selected media item to the recommendation server 32 of the central system 16. The recommendation server 32 then forwards the media recommendation to the peer devices of the other users in the buddy list of the user 14-1.

In this embodiment, in order to prevent the highest scored media item from being continually repeated, the recommendation client 28-1 applies a no-repeat-factor (NRF) to the score of the selected media item that just completed playback (step 322). As an example, the NRF may be a multiplier defined as:

$$NRF = \frac{MIN(10 \cdot NRFW, LASTREPEAT\_INDEX)}{10 \cdot NRFW},$$

where NRFW is a weight assigned to the NRF and LASTREPEAT_INDEX is a number of media items that have been played since the media item was last played. In this manner, once a media item is played, the score of the media item is substantially reduced and, over time, the score of the media item increases back to the score's original value (i.e., score for a NRF of 1). Once the NRF is applied to the score of the selected media item that has completed playback, the playlist is updated or re-sorted based on score (step 324). The process then returns to step 306 where the highest scored media item in the playlist is selected as the next media item to play and the process continues.

Returning to step 310, if a skip request has been received, the recommendation client 28-1 determines whether to send a media recommendation for the selected media item (step 326). More specifically, in one embodiment, the recommendation client 28-1 determines that a media recommendation for the selected media item is to be sent if a predetermined amount (e.g., 80%) of the selected media item was played before the skip request was received from the user 14-1. The predetermined amount needed before a media recommendation is sent may be configurable by the user 14-1. If a media recommendation is to be sent, the process proceeds to step 320 and continues as described above. Otherwise, the process proceeds to step 322 and continues as described above.

Figure 4:
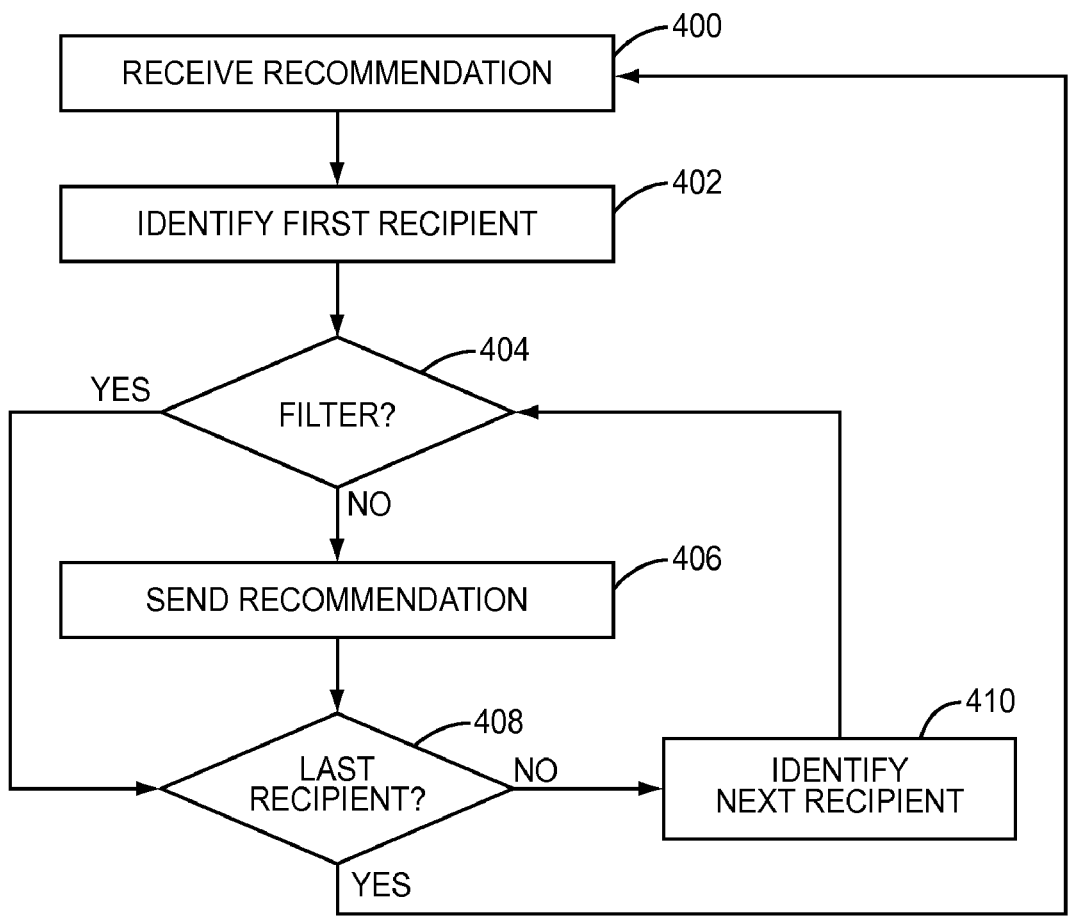
FIG. 4 is a flow chart illustrating the operation of the recommendation server of FIG. 1 during a normal playback session according to one embodiment of this disclosure.

FIG. 4 is a flow chart illustrating the operation of the recommendation server 32 in the normal mode of operation according to one embodiment of this disclosure. First, the recommendation server 32 receives a media recommendation (step 400). For this discussion, the media recommendation is received from the peer device 12-1. However, this discussion is also applicable to media recommendations received from the other peer devices 12-2 through 12-N. In this embodiment, the recommendation server 32 identifies a first recipient of the media recommendation (step 402). In one embodiment, the recommendation server 32 identifies the users in the buddy list of the user 14-1 as the recipients of the media recommendation. In an alternative embodiment, the media recommendation may include information identifying the recipients, or information identifying the recipients may be provided by the recommendation client 28-1 of the peer device 12-1 in association with the media recommendation.

For the first recipient, the recommendation server 32 determines whether the media recommendation is to be filtered based on the one or more filtering criteria for the first recipient stored in the user account 36 of the first recipient (step 404). Note that filtering is optional. If the media recommendation is to be filtered, the process proceeds to step 408. Otherwise, the recommendation server 32 sends the media recommendation to the peer device of the first recipient (step 406). Note that in one embodiment, the recommendation server 32 may append a reference to the recommended media item at the content server 38 to the media recommendation and/or append a reference to a preview of the recommended media item at the content server 38 to the media recommendation.

The recommendation server 32 then determines whether the media recommendation has been sent to the last recipient (step 408). If not, the recommendation server 32 identifies the next recipient of the media recommendation (step 410), and then the process returns to step 404 and is repeated. Once the media recommendation has been sent to the last recipient, the process returns to step 400 and is repeated for the next received media recommendation.

When operating in the normal mode of operation, the sequence of media items played at each of the peer devices 12-1 through 12-N may be disjointed in terms of theme. For instance, the user preferences 24-1 of the user 14-1, which are set in the abstract without respect to continuity, may indicate that the user 14-1 likes 80s Rock and that the user 14-1 likes Jazz. In reality, the user 14-1 would not typically play 80s Rock and Jazz together. However, in the normal mode of operation, if the peer device 12-1 receives media recommendations for both 80s Rock songs and Jazz songs, then the sequence of media items played by the peer device 12-1 would intermingle the 80s Rock songs and Jazz songs. This can lead to a disjointed and therefore undesirable playback experience for the user 14-1. Thus, in order to create a more desirable playback experience, a thematic playback session may be provided as described below.

FIGS. 5A, 5B, and 5C illustrate the operation of the system 10 to provide a thematic playback session according to one embodiment of this disclosure. First, in this exemplary embodiment, the recommendation client 28-1 of the peer device 12-1 initiates a thematic playback session (step 500). More specifically, in one embodiment, the user 14-1 interacts with the recommendation client 28-1 to initiate a thematic playback session. Next, the recommendation client 28-1 configures parameters defining the thematic playback session (step 502). In one embodiment, in response to the user 14-1 initiating a thematic playback session, the recommendation client 28-1 enables the user 14-1 to select the parameters defining the thematic playback session. The parameters defining the thematic playback session may be any of one or more parameters capable of defining a theme for a playback session. For example, for music, the parameters for the thematic playback session may include one or more desired music genres for the thematic playback session, one or more time periods such as decades desired for the thematic playback session, one or more artists desired for the thematic playback session, or the like. Similar parameters may be used for other types of media items such as other types of audio items and video items. In another embodiment, the user 14-1 may be enabled to select the parameters for the thematic playback session by selecting one of a number of predefined themes having associated predefined parameters.

The recommendation client 28-1 of the peer device 12-1 then sends a request for a thematic playback session to the recommendation server 32 of the central system 16 (step 504). The request may include the parameters defining the thematic playback session. In addition, the request may include information identifying who is to be invited to join the thematic playback session. In one embodiment, the user 14-1 is enabled to choose whether to invite all of the other users 14-2 through 14-N in the system 10 to join the thematic playback session, invite all other users in the buddy list of the user 14-1 to join the thematic playback session, or invite one or more select users from the buddy list of the user 14-1 to join the thematic playback session. In this exemplary embodiment, the users 14-2 and 14-3 of the peer devices 12-2 and 12-3 are to be invited to join the thematic playback session. As such, the recommendation server 32 of the central system 16 sends invitations to join the thematic playback session to the users 14-2 and 14-3 of the peer devices 12-2 and 12-3 (steps 506 and 508). The invitations may be sent using any suitable means. For example, the invitations may be sent via a communications feature of the recommendation clients 28-2 and 28-3, email, text messaging, or the like.

Upon receiving the invitations, the users 14-2 and 14-3 at the peer devices 12-2 and 12-3 are enabled to choose whether to opt-in or opt-out of the thematic playback session and corresponding responses are sent to the recommendation server 32 of the central system 16 (steps 510 and 512). The central system 16 then stores a list of users participating in the thematic playback session. In this example, both the user 14-2 and the user 14-3 have chosen to opt-in, or join, the thematic playback session. It should be noted that while in this exemplary embodiment the user 14-1 defines the parameters for the thematic playback session, the present invention is not limited thereto. For example, in an alternative embodiment, the users 14-1, 14-2, and 14-3 participating in the thematic playback session collectively define the parameters for the thematic playback session. Any suitable scheme for collectively defining the thematic playback parameters may be used. For example, the users 14-1, 14-2, and 14-3 may vote on the parameters for the thematic playback session or vote on which of a number of predefined themes having associated parameters is to be selected for the thematic playback session.

Once the parameters for the thematic playback session have been defined, the recommendation client 28-1 of the peer device 12-1 initializes a thematic playlist for the user 14-1 for the thematic playback session (step 514). More specifically, in one embodiment, the recommendation client 28-1 searches the media collection 22-1 stored by the peer device 12-1 for media items satisfying the parameters for the thematic playback session. The thematic playlist for the user 14-1 may be initialized with all of the media items from the media collection 22-1 satisfying the parameters for the thematic playback session. Alternatively, the recommendation client 28-1 may score the media items from the media collection 22-1 that satisfy the parameters for the thematic playback session based on the user preferences 24-1 of the user 14-1. Then, either a predetermined number of the highest scored media items or media items scored above a predetermined threshold score may be automatically selected. The thematic playlist of the user 14-1 may then be initialized with these automatically selected media items from the media collection 22-1. Alternatively, the user 14-1 may be enabled to select one or more of the media items from the media collection 22-1 satisfying the parameters for the thematic playback session for inclusion in the thematic playlist for the user 14-1.

In another embodiment, the recommendation client 28-1, or alternatively the recommendation server 32, searches the content server 38 for media items satisfying the parameters for the thematic playback session. The recommendation client 28-1 may score the media items available from the content server 38 that satisfy the parameters for the thematic playback session based on the user preferences 24-1 of the user 14-1. Then, either a predetermined number of the highest scored media items or media items scored above a predetermined threshold score may be automatically selected. The thematic playlist of the user 14-1 may then be initialized with these automatically selected media items from the media collection 22-1. Alternatively, the user 14-1 may be enabled to select one or more of the media items available from the content server 38 that satisfy the parameters for the thematic playback session for inclusion in the thematic playlist for the user 14-1. In yet another embodiment, the thematic playlist may be initialized with both media items from the media collection 22-1 and media items from the content server 38 that satisfy the parameters for the thematic playback session.

Once the thematic playlist for the user 14-1 is initialized, the recommendation client 28-1 selects a media item to play from the thematic playlist, which is referred to as media item A (step 516). In the preferred embodiment, the media items in the thematic playlist of the user 14-1 are scored based on the user preferences 24-1 of the user 14-1 and the thematic playlist is sorted based on the scores of the media items. The media item at the top of the thematic playlist, which is the media item having the highest score, is then selected as the media item to play (media item A). The recommendation client 28-1 of the peer device 12-1 then interacts with the playback function 26-1 of the peer device 12-1 to begin playback of media item A (step 518).

In a similar manner, the recommendation client 28-2 of the peer device 12-2 initializes a thematic playlist for the user 14-2 for the thematic playback session (step 520). More specifically, in one embodiment, the recommendation client 28-2 searches the media collection 22-2 stored by the peer device 12-2 for media items satisfying the parameters for the thematic playback session. The thematic playlist for the user 14-2 may be initialized with all of the media items from the media collection 22-2 satisfying the parameters for the thematic playback session. Alternatively, the recommendation client 28-2 may score the media items from the media collection 22-2 that satisfy the parameters for the thematic playback session based on the user preferences 24-2 of the user 14-2. Then, either a predetermined number of the highest scored media items or media items scored above a predetermined threshold score may be automatically selected. The thematic playlist of the user 14-2 may then be initialized with these automatically selected media items from the media collection 22-2. Alternatively, the user 14-2 may be enabled to select one or more of the media items from the media collection 22-2 satisfying the parameters for the thematic playback session for inclusion in the thematic playlist for the user 14-2.

In another embodiment, the recommendation client 28-2, or alternatively the recommendation server 32, searches the content server 38 for media items satisfying the parameters for the thematic playback session. The recommendation client 28-2 may score the media items available from the content server 38 that satisfy the parameters for the thematic playback session based on the user preferences 24-2 of the user 14-2. Then, either a predetermined number of the highest scored media items or media items scored above a predetermined threshold score may be automatically selected. The thematic playlist of the user 14-2 may then be initialized with these automatically selected media items from the media collection 22-2. Alternatively, the user 14-2 may be enabled to select one or more of the media items available from the content server 38 that satisfy the parameters for the thematic playback session for inclusion in the thematic playlist for the user 14-2. In yet another embodiment, the thematic playlist may be initialized with both media items from the media collection 22-2 and media items from the content server 38 that satisfy the parameters for the thematic playback session.

Once the thematic playlist for the user 14-2 is initialized, the recommendation client 28-2 selects a media item to play from the thematic playlist, which is referred to as media item B (step 522). In the preferred embodiment, the media items in the thematic playlist of the user 14-2 are scored based on the user preferences 24-2 of the user 14-2 and the thematic playlist is sorted based on the scores of the media items. The media item at the top of the thematic playlist, which is the media item having the highest score, is then selected as the media item to play (media item B). The recommendation client 28-2 of the peer device 12-2 then interacts with the playback function 26-2 of the peer device 12-2 to begin playback of media item B (step 524).

Likewise, the recommendation client 28-3 of the peer device 12-3 initializes a thematic playlist for the user 14-3 for the thematic playback session (step 526). Note that by initializing the thematic playlists of the users 14-1, 14-2, and 14-3 with media items satisfying the parameters for the thematic playback session, the recommendation clients 28-1, 28-2, and 28-3 ensure that media recommendations exchanged by the peer devices 12-1, 12-2, and 12-3 during the thematic playback session are for media items that satisfy the parameters of the thematic playback session. More specifically, in one embodiment, the recommendation client 28-3 searches the media collection 22-3 stored by the peer device 12-3 for media items satisfying the parameters for the thematic playback session. The thematic playlist for the user 14-3 may be initialized with all of the media items from the media collection 22-3 satisfying the parameters for the thematic playback session. Alternatively, the recommendation client 28-3 may score the media items from the media collection 22-3 that satisfy the parameters for the thematic playback session based on the user preferences 24-3 of the user 14-3. Then, either a predetermined number of the highest scored media items or media items scored above a predetermined threshold score may be automatically selected. The thematic playlist of the user 14-3 may then be initialized with these automatically selected media items from the media collection 22-3. Alternatively, the user 14-3 may be enabled to select one or more of the media items from the media collection 22-3 satisfying the parameters for the thematic playback session for inclusion in the thematic playlist for the user 14-3.

In another embodiment, the recommendation client 28-3, or alternatively the recommendation server 32, searches the content server 38 for media items satisfying the parameters for the thematic playback session. The recommendation client 28-3 may score the media items available from the content server 38 that satisfy the parameters for the thematic playback session based on the user preferences 24-3 of the user 14-3. Then, either a predetermined number of the highest scored media items or media items scored above a predetermined threshold score may be automatically selected. The thematic playlist of the user 14-3 may then be initialized with these automatically selected media items from the media collection 22-3. Alternatively, the user 14-3 may be enabled to select one or more of the media items available from the content server 38 that satisfy the parameters for the thematic playback session for inclusion in the thematic playlist for the user 14-3. In yet another embodiment, the thematic playlist may be initialized with both media items from the media collection 22-3 and media items from the content server 38 that satisfy the parameters for the thematic playback session.

Once the thematic playlist for the user 14-3 is initialized, the recommendation client 28-3 selects a media item to play from the thematic playlist, which is referred to as media item C (step 528). In the preferred embodiment, the media items in the thematic playlist of the user 14-3 are scored based on the user preferences 24-3 of the user 14-3 and the thematic playlist is sorted based on the scores of the media items. The media item at the top of the thematic playlist, which is the media item having the highest score, is then selected as the media item to play (media item C). The recommendation client 28-3 of the peer device 12-3 then interacts with the playback function 26-3 of the peer device 12-3 to begin playback of media item C (step 530).

In this example, the peer device 12-1 completes playback of media item A (step 532). Upon completing playback of media item A or at least a predetermined amount of media item A at the peer device 12-1, the recommendation client 28-1 of the peer device 12-1 sends a media recommendation for media item A to the recommendation server 32 of the central system 16 (step 534). The media recommendation sent to the central system 16 includes information identifying media item A. The information identifying media item A may be a GUID of media item A, metadata describing media item A, or the like. For example, if media item A is a song, the metadata describing the song may include a title of the song, an artist of the song, an album on which the song was released, a year in which the song was released, or the like.

Upon receiving the media recommendation for media item A from the peer device 12-1, the recommendation server 32 of the central system 16 identifies the recipients of the media recommendation. The recipients of the media recommendation include at least the other users participating in the thematic playback session, which in this example are the users 14-2 and 14-3. In addition, the recipients of the media recommendation may include any other users included in the buddy list of the user 14-1. In this exemplary embodiment, the users 14-2 and 14-3 at the peer devices 12-2 and 12-3 are identified as recipients of the media recommendation since the users 14-2 and 14-3 are participating in the thematic playback session. In an alternative embodiment, the recommendation client 28-1 of the peer device 12-1 may maintain the list of other users participating in the thematic playback session and either include the list of participants in the media recommendation sent to the recommendation server 32 or provide the list of participants to the recommendation server 32 in association with the media recommendation.

The recommendation server 32 of the central system 16 sends the media recommendation for media item A played by the peer device 12-1 to the peer devices 12-2 and 12-3 (steps 536 and 538). In one embodiment, the recommendation server 32 may append a reference to media item A at the content server 38 to the media recommendation and/or append a reference to a preview of media item A at the content server 38 to the media recommendation. Alternatively, the media recommendation from the peer device 12-1 may include a reference to media item A at the content server 38, a reference to a preview of media item A at the content server 38, or both.

In addition to sending the media recommendation for media item A to the recommendation server 32 of the central system 16, the recommendation client 28-1 selects a next media item to play, which is referred to as media item D (step 540), and begins playback of media item D (step 542). In this embodiment, no media recommendations have been received by the peer device 12-1, and the recommendation client 28-1 selects the next media item to play (media item D) from the thematic playlist of the user 14-1.

With respect to the peer device 12-2, during playback of media item B at the peer device 12-2 (which began in step 524), the recommendation client 28-2 of the peer device 12-2 receives the media recommendation for media item A played by the peer device 12-1 via the recommendation server 32 of the central system 16. Upon completing playback of media item B at the peer device 12-2 (step 544), the recommendation client 28-2 of the peer device 12-2 sends a media recommendation for media item B to the recommendation server 32 of the central system 16 (step 546). In the manner described above, the recommendation server 32 of the central system 16 then identifies the users 14-1 and 14-3 of the peer devices 12-1 and 12-3 as the recipients of the media recommendation for media item B and sends the media recommendation for media item B to the peer devices 12-1 and 12-3 (steps 548 and 550). In addition, the recommendation client 28-2 of the peer device 12-2 adds media item A identified by the media recommendation received from the peer device 12-1 to the thematic playlist of the user 14-2 and selects a next media item to play from the thematic playlist of the user 14-2, which is referred to as media item E (step 552). The recommendation client 28-2 then interacts with the playback function 26-2 of the peer device 12-2 to begin playback of media item E (step 554). Note that since media item A has been added to the thematic playlist of the user 14-2 at the peer device 12-2 as a result of the media recommendation from the peer device 12-1 received in step 536, if media item A is the highest scored media item in the thematic playlist of the user 14-2, then the next media item selected for playback at the peer device 12-2 (which is referred to as media item E) may be media item A. The reference elements A, B, C, etc. are used for clarity and ease of discussion and should not be interpreted as indicating that the media items A, B, C, etc. are necessarily different media items.

With respect to the peer device 12-3, during playback of media item C (which began in step 530) at the peer device 12-3, the recommendation client 28-3 of the peer device 12-3 receives the media recommendations for media items A and B played by the peer devices 12-1 and 12-2 via the recommendation server 32 of the central system 16. Upon completing playback of media item C at the peer device 12-3 (step 556), the recommendation client 28-3 of the peer device 12-3 sends a media recommendation for media item C to the recommendation server 32 of the central system 16 (step 558). In the manner described above, the recommendation server 32 of the central system 16 then identifies the users 14-1 and 14-2 of the peer devices 12-1 and 12-2 as the recipients of the media recommendation for media item C and sends the media recommendation for media item C to the peer devices 12-1 and 12-2 (steps 560 and 562). In addition, the recommendation client 28-3 of the peer device 12-3 adds media items A and B identified by the media recommendations received from the peer devices 12-1 and 12-3 to the thematic playlist of the user 14-3 and selects a next media item to play from the thematic playlist of the user 14-3, which is referred to as media item F (step 564). The recommendation client 28-3 then interacts with the playback function 26-3 of the peer device 12-3 to begin playback of media item F (step 566).

Returning to the peer device 12-1, during playback of media item D at the peer device 12-1 (which started in step 542), the recommendation client 28-1 of the peer device 12-1 receives the media recommendations for media items B and C played by the peer devices 12-2 and 12-3 via the recommendation server 32 of the central system 16. Upon completing playback of media item D at the peer device 12-3 (step 568), the recommendation client 28-1 of the peer device 12-1 sends a media recommendation for media item D to the recommendation server 32 of the central system 16 (step 570). In the manner described above, the recommendation server 32 of the central system 16 then identifies the users 14-2 and 14-3 of the peer devices 12-2 and 12-3 as the recipients of the media recommendation for media item D and sends the media recommendation for media item D to the peer devices 12-2 and 12-3 (steps 572 and 574). In addition, the recommendation client 28-1 of the peer device 12-1 adds media items B and C identified by the media recommendations received from the peer devices 12-2 and 12-3 to the thematic playlist of the user 14-1 and selects a next media item to play from the thematic playlist of the user 14-1, which is referred to as media item G (step 576). The recommendation client 28-1 then interacts with the playback function 26-1 of the peer device 12-1 to begin playback of media item G (step 578). From this point, the process continues such that the peer devices 12-1, 12-2, and 12-3 continue to send media recommendations automatically in response to playback of corresponding media items, receive media recommendations, and process the media recommendations to select next media items to play for the thematic playback session.

In this exemplary embodiment, at some point, the user 14-1 terminates the thematic playback session. As such, the recommendation client 28-1 of the peer device 12-1 sends a terminate request to the recommendation server 32 of the central system 16 (step 580). The recommendation server 32 of the central system 16 then forwards the terminate request to the recommendation clients 28-2 and 28-3 of the peer devices 12-2 and 12-3 (steps 582 and 584). At this point the thematic playback session is terminated. Optionally, the recommendation clients 28-1, 28-2, and 28-3 may save the thematic playback sessions at the peer devices 12-1, 12-2, and 12-3 (steps 586, 588, and 590). In one exemplary alternative embodiment, the users 14-2 and 14-3 may continue the thematic playback session even after the user 14-1 has exited the thematic playback session. Thus, in this alternative embodiment, the thematic playback session may continue as long as two or more users continue to participate in the thematic playback session.

FIGS. 6A and 6B are a flow chart illustrating the operation of the recommendation client 28-1 of the peer device 12-1 to provide a thematic playback session according to one embodiment of this disclosure. This discussion is equally applicable to the recommendation clients 28-2 through 28-N of the other peer devices 12-2 through 12-N. First, the recommendation client 28-1 receives input from the user 14-1 initiating a thematic playback session (step 600). Next, in this embodiment, the recommendation client 28-1 configures parameters for the thematic playback session (step 602). More specifically, in one embodiment, the recommendation client 28-1 enables the user 14-1 to select or otherwise define the parameters for the thematic playback session. As discussed above, the parameters for the thematic playback session may be any type of parameters capable of defining a theme for a playback session. For example, for music, the parameters for the thematic playback session may include one or more desired music genres for the thematic playback session, one or more time periods such as decades desired for the thematic playback session, one or more artists desired for the thematic playback session, or the like. Similar parameters may be used for other types of media items such as other types of audio items and video items. In another embodiment, the user 14-1 may be enabled to select the parameters for the thematic playback session by selecting one of a number of predefined themes having associated parameters.

In addition, in one embodiment, when configuring the parameters for the thematic playback session, the recommendation client 28-1 may also enable the user 14-1 to select who to invite to join the thematic playback session. The user 14-1 may be enabled to select to invite all of the other users 14-2 through 14-N in the system 10, invite all of the other users in the buddy list of the user 14-1, or invite one or more selected users from the buddy list of the user 14-1.

Next, the recommendation client 28-1 sends a request for the thematic playback session to the recommendation server 32 of the central system 16 (step 604). The request may include the parameters defining the thematic playback session. In addition, the request may include information identifying who is to be invited to join the thematic playback session. As discussed above, in response to receiving the request for the thematic playback session, the recommendation server 32 sends invitations to the users to be invited to join the thematic playback session, and the invited users opt-in or opt-out of the thematic playback session. Again, it should be noted that while in this exemplary embodiment the user 14-1 defines the parameters for the thematic playback session, the present invention is not limited thereto. For example, in an alternative embodiment, the user 14-1 and the other users that are invited and opt-in to the thematic playback session collectively define the parameters for the thematic playback session. Any suitable scheme for collectively defining the parameters for the thematic playback session may be used. For example, a voting scheme may be used.

Next, the recommendation client 28-1 of the peer device 12-1 initializes a thematic playlist for the user 14-1 for the thematic playback session (step 606). In general, the recommendation client 28-1 initializes a thematic playlist for the user 14-1 with one or more media items that satisfy the parameters for the thematic playback session. More detailed processes for initializing the thematic playlist of the user 14-1 are described below. Once the thematic playlist for the user 14-1 is initialized, the recommendation client 28-1 selects a media item to play from the thematic playlist (step 608). In this embodiment, the media items in the thematic playlist of the user 14-1 are scored based on the user preferences 24-1 of the user 14-1 and the thematic playlist is sorted based on the scores of the media items. The media item at the top of the thematic playlist, which is the media item having the highest score, is then selected as the media item to play. The recommendation client 28-1 of the peer device 12-1 then interacts with the playback function 26-1 of the peer device 12-1 to begin playback of the selected media item (step 610).

After playback has begun, the recommendation client 28-1 determines whether a request to skip to the next media item, which is referred to herein as a skip request, has been received from the user 14-1 (step 612). If a skip request has not been received, the recommendation client 28-1 determines whether playback of the selected media item is complete (step 614). If playback is not complete, the recommendation client 28-1 determines whether a media recommendation has been received from the recommendation server 32 of the central system 16 (step 616). If a media recommendation has not been received, the process returns to step 612 and is repeated. If a media recommendation has been received, the recommendation client 28-1 scores the recommended media item identified by the media recommendation based on the user preferences 24-1 of the user 14-1 (step 618). For a more detailed discussion of an exemplary scoring process, the interested reader is directed to U.S. Patent Application Publication No. 2008/0016205, entitled P2P NETWORK FOR PROVIDING REAL TIME MEDIA RECOMMENDATIONS, which was filed on Jul. 11, 2006 and published on Jan. 17, 2008, which has been incorporated herein by reference in its entirety.

In this embodiment, since not all users in the buddy list of the user 14-1 may opt-in to the thematic playback session, the recommendation client 28-1 of the peer device 12-1 may receive media recommendations that are not part of the thematic playback session. As such, media recommendations may be tagged as belonging to the thematic playback session if the media recommendations are sent by a peer device of a user participating in the thematic playback session. In an alternative embodiment, during the thematic playback session, the recommendation server 32 of the central system 16 may filter media recommendations from users that are not participating in the thematic playback session. These non-thematic media recommendations may be discarded or stored by the recommendation server 32 for subsequent delivery after the thematic playback session has ended.

As such, in this embodiment, the recommendation client 28-1 determines whether the received media recommendation is a thematic media recommendation (i.e., a media recommendation sent as part of the thematic playback session) (step 620). If so, the recommendation client 28-1 updates the thematic playlist of the user 14-1 for the thematic playback session to include the recommended media item (step 622). More specifically, in one embodiment, the recommended media item is inserted into the thematic playlist of the user 14-1 according to the score of the recommended media item. Note that, in one embodiment, if the recommended media item is not already stored in the media collection 22-1 at the peer device 12-1, in addition to inserting the recommended media item into the thematic playlist, the recommendation client 28-1 may insert the recommended media item into a download queue. In one embodiment, media items in the download queue scored above a first threshold score are automatically downloaded from the content server 38. Previews of media items in the download queue that are scored less than the first threshold score but greater than a second threshold score may be downloaded and played in place of the complete media item. Neither a preview nor the complete media item may be downloaded for media items in the download queue that are scored less than the second threshold score. Once the thematic playlist is updated, the process returns to step 612 and is repeated.

Returning to step 620, if the media recommendation is not a thematic media recommendation, the recommendation client 28-1 stores the media recommendation in a non-thematic media recommendation queue (step 624). The media recommendations in the non-thematic media recommendation queue may thereafter be utilized after the thematic playback session has been terminated. For example, once the thematic playback session has been terminated, the media recommendations in the non-thematic media recommendation queue may be inserted into a playlist for a subsequent playback session based on score. Once the media recommendation is stored in the non-thematic media recommendation queue, the process returns to step 612 and is repeated.

Returning to step 614, if playback of the selected media item is complete, the recommendation client 28-1 sends a media recommendation for the selected media item (step 626). Playback of the selected media item may be complete when the entire media item has been played or when playback has reached a predetermined point in the media item such as, for example, a predetermined number of seconds from the end of playback of the selected media item. As discussed above, in the exemplary system 10 of FIG. 1, the recommendation client 28-1 sends the media recommendation for the selected media item to the recommendation server 32 of the central system 16. The recommendation server 32 then forwards the media recommendation to the peer devices of the users participating in the thematic playback session and, optionally, any other users in the buddy list of the user 14-1.

In this embodiment, in order to prevent the highest scored media item from being continually repeated, the recommendation client 28-1 applies a NRF to the score of the selected media item at the completion of playback of the selected media item (step 628). As an example, the NRF may be a multiplier defined as:

$$NRF = \frac{MIN(10 \cdot NRFW, LASTREPEAT\_INDEX)}{10 \cdot NRFW},$$

where NRFW is a weight assigned to the NRF and LASTREPEAT_INDEX is a number of media items that have been played since the media item was last played. In this manner, once a media item is played, the score of the media item is substantially reduced and, over time, the score of the media item increases back to the score's original value (i.e., score for a NRF of 1). Once the NRF is applied to the score of the selected media item that has completed playback, the thematic playlist of the user 14-1 is updated or re-sorted based on score (step 630). The process then returns to step 608 where the highest scored media item in the thematic playlist is selected as the next media item to play and the process continues.

Returning to step 612, if a skip request has been received, the recommendation client 28-1 determines whether to send a media recommendation for the selected media item (step 632). More specifically, in one embodiment, the recommendation client 28-1 determines that a media recommendation for the selected media item is to be sent if a predetermined amount (e.g., 80%) of the selected media item was played before the skip request was received from the user 14-1. The predetermined amount needed before a media recommendation is sent may be configurable by the user 14-1. If a media recommendation is to be sent, the process proceeds to step 626 and continues as described above. Otherwise, the process proceeds to step 628 and continues as described above.

FIG. 7 is a more detailed illustration of step 606 of FIG. 6A according to one embodiment of this disclosure. In this embodiment, in order to initialize the thematic playlist of the user 14-1, the recommendation client 28-1 of the peer device 12-1 searches the media collection 22-1 stored by the peer device 12-1 for media items satisfying the parameters of the thematic playback session (step 606A). The recommendation client 28-1 then creates or initializes the thematic playlist of the user 14-1 with one or more of the media items from the media collection 22-1 stored by the peer device 12-1 that satisfy the parameters for the thematic playback session (step 606B). More specifically, in one embodiment, the recommendation client 28-1 may automatically initialize the thematic playlist of the user 14-1 with all of the media items from the media collection 22-1 stored by the peer device 12-1 that satisfy the parameters of the thematic playback session. In another embodiment, the recommendation client 28-1 may score the media items from the media collection 22-1 that satisfy the parameters of the thematic playback session based on the user preferences 24-1 of the user 14-1 and automatically initialize the thematic playlist of the user 14-1 with a predetermined number of the highest scored media items or with a number of media items having scores above a predetermined threshold score. In yet another embodiment, the recommendation client 28-1 may present a list of the media items from the media collection 22-1 stored at the peer device 12-1 that satisfy the parameters of the thematic playback session to the user 14-1 and enable the user 14-1 to select one or more of those media items with which to initialize the thematic playlist of the user 14-1.

FIG. 8 is a more detailed illustration of step 606 of FIG. 6A according to another embodiment of this disclosure. In this embodiment, in order to initialize the thematic playlist of the user 14-1, the recommendation client 28-1 obtains a list of media items available from the content server 38 that satisfy the parameters of the thematic playback session (step 606A). In one embodiment, the recommendation client 28-1 may query the content server 38 for the list of media items available from the content server 38 that satisfy the parameters of the thematic playback session. In another embodiment, the recommendation server 32 may query the content server 38 for the list of media items available from the content server 38 that satisfy the parameters for the thematic playback session. The recommendation server 32 may then provide the list of media items to the recommendation client 28-1 of the peer device 12-1 as well as the recommendation clients of the other peer devices in the thematic playback session.

The recommendation client 28-1 then initializes the thematic playlist of the user 14-1 with one or more media items from the list of media items available from the content server 38 that satisfy that parameters of the thematic playback session (step 606B). More specifically, in one embodiment, the recommendation client 28-1 may automatically initialize the thematic playlist of the user 14-1 with all of the media items available from the content server 38 that satisfy the parameters of the thematic playback session. This may be desirable only where the number of media items in the list is suitable for a playlist of a single user (e.g., less than a predetermined number of items, such as 100 media items). In another embodiment, the recommendation client 28-1 may score the media items in the list of media items available from the content server 38 that satisfy the parameters of the thematic playback session based on the user preferences 24-1 of the user 14-1. The recommendation client 28-1 may then automatically initialize the thematic playlist of the user 14-1 with a predetermined number of the highest scored media items or with a number of the media items having scores above a predetermined threshold score. In yet another embodiment, the recommendation client 28-1 may present the list of media items available from the content sever 38 that satisfy the parameters for the thematic playback session to the user 14-1 and enable the user 14-1 to select one or more of those media items with which to initialize the thematic playlist of the user 14-1. Note that the embodiments of FIGS. 7 and 8 are not mutually exclusive. In another embodiment, the thematic playlist of the user 14-1 may be initialized with both media items from the media collection 22-1 and media items available from the content server 38.

FIG. 9 is a flow chart illustrating the operation of the recommendation server 32 to provide a thematic playback session according to one embodiment of this disclosure. First, the recommendation server 32 receives a media recommendation (step 700). Next, the recommendation server 32 determines whether the media recommendation is a thematic media recommendation (i.e., a media recommendation sent by a peer device participating in a thematic playback session) (step 702). If so, in this embodiment, the recommendation server 32 tags the media recommendation as a thematic media recommendation (step 704).

At this point, whether the media recommendation is or is not a thematic media recommendation, the recommendation server 32 identifies a first recipient of the media recommendation (step 706). The recipients of the media recommendation may vary depending on the particular embodiment. In this embodiment, if the media recommendation is a non-thematic media recommendation (i.e., a media recommendation sent by a peer device that is not participating in a thematic playback session), the recipients of the media recommendation are the users in the buddy list of the user of the peer device that sent the media recommendation. If the media recommendation is a thematic media recommendation, the recipients of the media recommendation are the users participating in the thematic playback session (other than the user of the peer device from which the media recommendation was sent). In addition, if the media recommendation is a thematic media recommendation, the recipients may include any other users in the buddy list of the user of the peer device that sent the media recommendation that are not participating in the thematic playback session. However, in another embodiment, if the media recommendation is a thematic media recommendation, the media recommendation is sent only to the peer devices of the other users participating in the thematic playback session.

Once the first recipient is identified, the recommendation sever 32 determines whether the media recommendation is to be filtered based on the one or more filtering criteria for the recipient stored in the user account 36 of the recipient (step 708). Note that filtering is optional. If the media recommendation is to be filtered, the process proceeds to step 712. Otherwise, the recommendation server 32 sends the media recommendation to the first recipient (step 710). Note that in one embodiment, the recommendation server 32 may append a reference to the recommended media item at the content server 38 to the media recommendation and/or append a reference to a preview of the recommended media item at the content server 38 to the media recommendation.

The recommendation server 32 then determines whether the media recommendation has been sent to the last recipient (step 712). If not, the recommendation server 32 identifies the next recipient of the media recommendation (step 714), and then the process returns to step 708 and is repeated. Once the media recommendation has been sent to the last recipient, the process returns to step 700 and is repeated for the next received media recommendation.

In an alternative embodiment, in the filtering step 708, in addition to or as an alternative to filtering based on the one or more filtering criteria of the recipient, the recommendation server 32 may filter non-thematic media recommendations if the recipient is participating in a thematic playback session. In this case, the filtered non-thematic media recommendation may be discarded or stored by the recommendation server 32 for subsequent delivery to the recipient after the recipient is no longer participating in the thematic playback session.

FIGS. 10-13 illustrate exemplary Graphical User Interfaces (GUIs) enabling a thematic playback session according to one embodiment of this disclosure. FIG. 10 illustrates a GUI 40 provided by the media player function 20-1 of the peer device 12-1 during a playback session. By selecting a thematic playback session button 42, the user 14-1 may initiate a thematic playback session. In response to selecting the thematic playback session button 42, a GUI 44 enabling the user 14-1 to select configurations for the thematic playback session including the parameters for the thematic playback session is presented to the user 14-1 as illustrated in FIG. 11.

In this exemplary embodiment, the GUI 44 of FIG. 11 includes an invitations area 46, a source area 48, and a theme area 50. Generally, the invitations area 46 enables the user 14-1 to select who to invite to join the thematic playback session. More specifically, in this embodiment, the user 14-1 may choose to invite all online users, or members, of the system 10 by selecting a corresponding radio button 52. Alternatively, the user 14-1 may choose to invite one or more users in the buddy list of the user 14-1 by selecting a corresponding radio button 54. If the user 14-1 chooses to invite one or more of the other users in the buddy list of the user 14-1, the user 14-1 may choose to invite all of the other users in the buddy list of the user 14-1 by selecting check box 56 or choose to invite select ones of the other users in the buddy list by selecting one or more corresponding check boxes 58-66.

The source area 48 enables the user 14-1 to configure the thematic playback session such that the thematic playlists of the users participating in the thematic playback session are initialized with media items from the media collections stored by the corresponding peer devices by selecting a corresponding radio button 68. By selecting radio button 70, the user 14-1 may configure the thematic playback session such that the thematic playlists of the users participating in the thematic playback session are initialized with media items from a catalog of media items available from the content server 38 via a subscription based service. Note that the GUI 44 may enable the user 14-1 to select only one of the radio buttons 68 and 70 or may enable the user 14-1 to select both of the radio buttons 68 and 70 if desired.

In an alternative embodiment, the source area 48 may enable the user 14-1 to configure the thematic playback session such that the media collections stored by the peer devices of the participants are utilized or such that a catalog of media items available from the content server 38 via a subscription service may be utilized. More specifically, by selecting the radio button 68, the initial thematic playlists of the users participating in the thematic playback session, including the user 14-1, may be limited to media items in the corresponding media collections of the users. Still further, while thematic media recommendations are exchanged during the thematic playback session, each peer device in the thematic playback session may discard media recommendations for media items that are not included in the media collection stored at the peer device or prioritize recommended media items that are included in the media collection stored at the peer device.

Thus, using the peer device 12-1 as an example, if the peer device 12-1 were to receive a media recommendation for a media item that is not included in the media collection 22-1, the recommendation client 28-1 of the peer device 12-1 may discard the media recommendation or assign the media recommendation a low priority by, for example, reducing a score of the corresponding recommended media item in the thematic playlist. Note that the GUI 44 may enable the user 14-1 to select only one of the radio buttons 68 and 70 such that only the media collections stored by the peer devices of the participants or only the catalog of media items available from the content server 38 are utilized. Alternatively, the GUI 44 may enable the user 14-1 to select both of the radio buttons 68 and 70 if desired such that both the media collections stored by the peer devices of the participants and the catalog of media items available from the content server 38 are utilized.

The theme area 50 enables the user 14-1 to select the parameters for the thematic playback session. Optionally, the user 14-1 may be enabled to provide a description of the thematic playback session in a description field 72. The description may be included in the invitations to join the thematic playback session sent to the users identified in the invitations area 46. In this embodiment, the user 14-1 may define the parameters for the thematic playback session as a number of search terms or by defining one or more metadata based criterion. More specifically, if the user 14-1 desires to define the parameters as one or more search terms, the user 14-1 selects a radio button 74 and enters the desired search terms in field 76.

If the user 14-1 desires to define the parameters as one or more metadata based criterion, the user 14-1 selects radio button 78, selects whether all or any of the one or more metadata based criterion must be satisfied by selecting one of the radio buttons 80 and 82, and defines a metadata based criterion using tools 84-88. In this example, the media items are songs. As such, a pull down menu 84 enables the user 14-1 to select a desired metadata category for the metadata based criterion. The metadata category may be, for example, genre, year of release, artist, or the like. A pull down menu 86 enables the user 14-1 to select a desired matching criterion. The matching criterion may vary depending on the metadata category. For example, for genre, the matching criterion may be "contains," "the same as," or the like. As another example, for year of release, the matching criterion may be "is equal to," "is greater than," "is less than," "is in the range of," or the like. In general, the matching criterion defines a degree to which the metadata of a media item for the metadata category selected in the pull down menu 84 must match a value entered in field 88 before the media item is determined to satisfy the metadata based criterion. The field 88 enables the user 14-1 to enter a desired value for the metadata category selected in the pull down menu 84. For example, if the selected metadata category is genre, then the user 14-1 may enter "Rock," "Jazz," or the like in the field 88. Buttons 90 and 92 enable the user 14-1 to remove a metadata based criterion or add a new metadata based criterion, respectively.

Once the user 14-1 has selected the configurations for the thematic playback session, the user 14-1 may select an OK button 94. In response, the recommendation client 28-1 of the peer device 12-1 then sends a request for the thematic playback session to the recommendation server 32, and the process continues as described above. The user 14-1 may select a Cancel button 96 to cancel the creation of the thematic playback session if desired.

FIG. 12 is an exemplary invitation 98 that may be sent to a user to invite the user to join a thematic playback session. In this embodiment, the invitation 98 includes a text-based description or title of the thematic playback session and the parameters for the thematic playback session. The user may opt-in to the thematic playback session by selecting an Accept button 100 or opt-out of the thematic playback session by selecting a Decline button 102.

FIG. 13 is an exemplary GUI 104 for the media player function 20-1 of the peer device 12-1 during a thematic playback session. As illustrated, the GUI 104 includes an indicator 106 that the user 14-1 is currently participating in a thematic playback session entitled "80s Rock." The GUI 104 displays a thematic playlist 108 of the user 14-1 for the thematic playback session. In addition, in this embodiment, the GUI 104 displays a non-thematic media recommendation queue 110, which in this example is located at the end of the thematic playlist 108. The media items in the thematic playlist 108 are sorted based on score 112. Likewise, in this example, the media items in the non-thematic media recommendation queue 110 are sorted based on score 112.

FIGS. 14A and 14B are an exemplary GUI 114 for the media player function 20-1 of the peer device 12-1 after a thematic playback session has been terminated and stored according to one embodiment of this disclosure. As illustrated in the GUI 114 includes a playback session area 116 for a current playback session of the user 14-1. In addition, the GUI 114 includes a stored playback session area 118 in which one or more stored thematic playback sessions are displayed and accessible. In this example, an 80s Rock thematic playback session has been saved and is displayed in the stored playback session area 118. By selecting button 120, the 80s Rock thematic playback session can be expanded to view the thematic playlist at the time the 80s Rock thematic playback session was terminated or otherwise exited by the user 14-1. The user 14-1 may be enabled to play the thematic playlist offline (without sending or receiving media recommendations), use the thematic playlist as an initial playlist for a future playback session or as part of an initial playlist for a future playback session, and/or reinitiate the thematic playback session.

FIG. 15 is a block diagram of the peer device 12-1 of FIG. 1 according to one embodiment of this disclosure. This discussion is equally applicable to the other peer devices 12-2 through 12-N. In general, the peer device 12-1 includes a controller 122 having associated memory 124. The controller 122 may be any type of digital processor such as, but not limited to, a Central Processing Unit (CPU), an Application Specific Integrated Circuit (ASIC), a Field Programmable Gate Array (FPGA), or the like. The memory 124 may be Random Access Memory (RAM) or the like. The peer device 12-1 may also include non-volatile storage 126 such as, for example, flash memory, Read Only Memory (ROM), a magnetic hard disk drive, an optical storage device, or the like. In one embodiment, the media player function 20-1 is stored in the non-volatile storage 126 and loaded into the memory 124 for execution by the controller 122 when desired. However, the present invention is not limited thereto. In another embodiment, the media player function 20-1 may be implemented in hardware embedded within the controller 122 or associated with the controller 122 or implemented in a combination of hardware and software. The media collection 22-1 may be stored in the non-volatile storage 126 or in the memory 124. Similarly, the user preferences 24-1 may be stored in the non-volatile storage 126 or in the memory 124.

The peer device 12-1 also includes a communication interface 128 enabling the peer device 12-1 to connect to the network 18 (FIG. 1). The communication interface 128 is a physical component. However, the details of the communication interface 128 may vary depending on the particular embodiment. For example, in one embodiment, the communication interface 128 is a Network Interface Card (NIC) providing Ethernet connectivity, wireless IEEE 802.11x connectivity, or the like. In another embodiment, the communication interface 128 is a cellular communications interface such as, for example, a 3G, a 3.5G, or a 4G cellular communications interface such as, but not limited to, a GSM interface, a W-CDMA interface, a WiMAX interface, a Long Term Evolution (LTE) interface, or the like. Lastly, the peer device 12-1 includes a user interface 130. The user interface 130 includes one or more user input devices such as a touch screen, a keypad, a keyboard, a mouse, a microphone, or the like. In addition, the user interface 130 includes one or more output devices such as a display, a speaker, or the like.

FIG. 16 is a block diagram of the central system 16 of FIG. 1 according to one embodiment of this disclosure. In general, the central system 16 includes a controller 132 having associated memory 134. The controller 132 may be any type of digital processor such as, but not limited to, a CPU, an ASIC, a FPGA, or the like. The memory 134 may be RAM or the like. The central system 16 may also include non-volatile storage 136 such as, for example, flash memory, ROM, a magnetic hard disk drive, an optical storage device, or the like. In one embodiment, the recommendation server 32 (FIG. 1) is stored in the non-volatile storage 136 and loaded into the memory 134 for execution by the controller 132 when desired. However, the present invention is not limited thereto. In another embodiment, the recommendation server 32 may be implemented in hardware embedded within the controller 132 or associated with the controller 132 or implemented in a combination of hardware and software. The user accounts database 34 may be stored in the non-volatile storage 136 or in the memory 134.

The central system 16 also includes a communication interface 138 enabling the central system 16 to connect to the network 18 (FIG. 1). The communication interface 138 is a physical component. However, the details of the communication interface 138 may vary depending on the particular embodiment. For example, in one embodiment, the communication interface 138 is a NIC providing Ethernet connectivity, wireless IEEE 802.11x connectivity, or the like. In another embodiment, the communication interface 138 is a cellular communications interface such as, for example, a 3G, a 3.5G, or a 4G cellular communications interface such as, but not limited to, a GSM interface, a W-CDMA interface, a WiMAX interface, an LTE interface, or the like. Lastly, the central system 16 may include a user interface 140. The user interface 140 may include one or more user input devices such as a touch screen, a keypad, a keyboard, a mouse, a microphone, or the like. In addition, the user interface 140 may include one or more output devices such as a display, a speaker, or the like.

The P2P media recommendation system 10 described herein has substantial opportunity for variation without departing from the spirit or scope of the present invention. For example, in an alternative embodiment, the recommendation server 32 may be implemented on one of the peer devices 12-1 through 12-N or implemented in a distributed manner on two or more of the peer devices 12-1 through 12-N. As another example, the media player functions 20-1 through 20-N of the peer devices 12-1 through 12-N may be implemented, partially or completely, at the central system 16. More specifically, if implemented on the central system 16, the media player functions 20-1 through 20-N may provide streaming media playback to the peer devices 12-1 through 12-N via suitable streaming media players at the peer devices 12-1 through 12-N. In this embodiment, the playlists for the playback sessions of the users 14-1 through 14-N are maintained at the central system 16 and media recommendations are exchanged internally within the central system 16. For more information regarding a similar system, the interested reader is directed to U.S. Patent Application Publication No. 2008/0319833, entitled P2P REAL TIME MEDIA RECOMMENDATIONS, which was filed on Aug. 21, 2008 and published on Dec. 25, 2008, and is hereby incorporated herein by reference in its entirety.

Those skilled in the art will recognize improvements and modifications to the preferred embodiments of the present invention. All such improvements and modifications are considered within the scope of the concepts disclosed herein and the claims that follow.

What is claimed is:

1. A peer device in a Peer-to-Peer (P2P) media recommendation system comprising:
   a communication interface; and
   a control system associated with the communication interface and adapted to:
   initialize a thematic playlist for a first user of the peer device to include one or more media items satisfying one or more parameters for a thematic playback session;
   begin playback of a first media item from the thematic playlist;
   during playback of the first media item, receive one or more media recommendations from at least one of one or more peer devices of one or more second users participating in the thematic playback session;
   update the thematic playlist of the first user to include one or more recommended media items identified by the one or more media recommendations to provide an updated thematic playlist; and
   upon completion of playback of at least a predetermined amount of the first media item:
   send a media recommendation for the first media item such that the media recommendation is sent to at least one of the one or more peer devices of the one or more second users participating in the thematic playback session;
   select a second media item to play from the updated thematic playlist; and
   begin playback of the second media item.

2. The peer device of claim 1 wherein in order to initialize the thematic playlist for the first user, the control system is further adapted to:
   search a media collection stored by the peer device to identify a plurality of media items that satisfy the one or more parameters for the thematic playback session; and
   initialize the thematic playlist for the first user to include one or more media items from the plurality of media items from the media collection stored by the peer device that satisfy the one or more parameters for the thematic playback session.

3. The peer device of claim 2 wherein the control system is adapted to initialize the thematic playlist for the first user to include all of the plurality of media items from the media collection stored by the peer device that satisfy the one or more parameters of the thematic playback session.

4. The peer device of claim 2 wherein in order to initialize the thematic playlist for the first user to include one or more media items from the plurality of media items from the media collection stored by the peer device that satisfy the one or more parameters for the thematic playback session, the control system is further adapted to:

score each of the plurality of media items from the media collection stored by the peer device that satisfy the one or more parameters for the thematic playback session based on user preferences of the first user; and initialize the thematic playlist for the first user with a number (N) of highest scored media items from the plurality of media items, wherein the number (N) is a predetermined number greater than or equal to 1.

5. The peer device of claim 2 wherein in order to initialize the thematic playlist for the first user to include one or more media items from the plurality of media items from the media collection stored by the peer device that satisfy the one or more parameters for the thematic playback session, the control system is further adapted to:

score each of the plurality of media items from the media collection stored by the peer device that satisfy the one or more parameters for the thematic playback session based on user preferences of the first user; and initialize the thematic playlist for the first user with one or more media items from the plurality of media items scored above a predetermined threshold.

6. The peer device of claim 2 wherein in order to initialize the thematic playlist for the first user to include one or more media items from the plurality of media items from the media collection stored by the peer device that satisfy the one or more parameters for the thematic playback session, the control system is further adapted to:

enable the first user to select one or more of the plurality of media items for the thematic playlist for the first user from the media collection stored by the peer device that satisfy the one or more parameters for the thematic playback session; and initialize the thematic playlist for the first user with the one or more of the plurality of media items selected by the first user.

7. The peer device of claim 1 wherein in order to initialize the thematic playlist for the first user, the control system is further adapted to:

obtain a list of media items available from a remote content server that satisfy the one or more parameters for the thematic playback session; and initialize the thematic playlist for the first user to include one or more media items from the list of media items available from the remote content server that satisfy the one or more parameters for the thematic playback session.

8. The peer device of claim 7 wherein in order to initialize the thematic playlist for the first user to include one or more media items from the list of media items available from the remote content server that satisfy the one or more parameters for the thematic playback session, the control system is further adapted to:

score each media item in the list of media items available from the remote content server that satisfy the one or more parameters for the thematic playback session based on user preferences of the first user; and initialize the thematic playlist for the first user with a number (N) of highest scored media items from the list of media items, wherein the number (N) is a predetermined number greater than or equal to 1.

9. The peer device of claim 7 wherein in order to initialize the thematic playlist for the first user to include one or more media items from the list of media items available from the remote content server that satisfy the one or more parameters for the thematic playback session, the control system is further adapted to:

score each media item in the list of media items available from the remote content server that satisfy the one or more parameters for the thematic playback session based on user preferences of the first user; and initialize the thematic playlist for the first user with one or more media items from the list of media items scored above a predetermined threshold.

10. The peer device of claim 7 wherein in order to initialize the thematic playlist for the first user to include one or more media items from the list of media items available from the remote content server that satisfy the one or more parameters for the thematic playback session, the control system is further adapted to:

enable the first user to select one or more media items for the thematic playlist for the first user from the list of media items available from the remote content server that satisfy the one or more parameters for the thematic playback session; and initialize the thematic playlist for the first user with the one or more media items selected by the first user.

11. The peer device of claim 1 wherein the thematic playlist is initialized with one or more media items from a media collection stored by the peer device that satisfy the one or more parameters for the thematic playback session and one or more media items available from a remote content server that satisfy the one or more parameters for the thematic playback session.

12. The peer device of claim 1 wherein the control system is further adapted to enable the first user to define the one or more parameters for the thematic playback session.

13. The peer device of claim 1 wherein the one or more parameters for the thematic playback session are collectively defined by the first user and the one or more second users participating in the thematic playback session.

14. The peer device of claim 1 wherein the control system is further adapted to enable the first user to select a plurality of other users to invite to join the thematic playback session.

15. The peer device of claim 14 wherein the plurality of other users are all online users of the P2P media recommendation system.

16. The peer device of claim 14 wherein the plurality of other users are users in a buddy list of the first user.

17. The peer device of claim 14 wherein the plurality of other users are one or more select users from a buddy list of the first user.

18. The peer device of claim 1 wherein during playback of the first media item, the control system is further adapted to:

receive a media recommendation from a peer device of a user that is not participating in the thematic playback session; and prioritize the one or more media recommendations from the at least one of the one or more peer devices of the one or more second users participating in the thematic playback session over the media recommendation received from the peer device of the user that is not participating in the thematic playback session.

19. The peer device of claim 18 wherein in order to prioritize the one or more media recommendations from the at least one of the one or more peer devices of the one or more second users participating in the thematic playback session over the media recommendation received from the peer device of the user that is not participating in the thematic playback session, the control system is further adapted to:

insert a recommended media item identified by the media recommendation from the peer device of the user that is not participating in the thematic playback session in a non-thematic media recommendation queue rather than the thematic playlist for the first user.

20. The peer device of claim 1 wherein during playback of the first media item, the control system is further adapted to:
receive a media recommendation from a peer device of a user that is not participating in the thematic playback session; and
discard the media recommendation from the peer device of the user that is not participating in the thematic playback session.

21. The peer device of claim 1 wherein the control system is further adapted to:
during playback of the second media item, receive one or more second media recommendations from at least one of the one or more peer devices of the one or more second users participating in the thematic playback session;
further update the thematic playlist of the first user to include one or more recommended media items identified by the one or more second media recommendations to provide a further updated thematic playlist; and
upon completion of playback of at least a predetermined amount of the second media item:
send a media recommendation for the second media item such that the media recommendation for the second media item is sent to at least one of the one or more peer devices of the one or more second users participating in the thematic playback session;
select a third media item to play from the further updated thematic playlist; and
begin playback of the third media item.

22. The peer device of claim 1 wherein the control system is further adapted to:
score each media item in the thematic playlist based on user preferences of the first user; and
select a highest scored media item in the thematic playlist as the first media item to play.

23. The peer device of claim 22 wherein:
the control system is further adapted to score the one or more recommended media items based on the user preferences of the first user; and
in order to select the second media item to play, the control system is further adapted to reduce a score of the first media item in the updated thematic playlist and, after reducing the score of the first media item, select a highest scored media item in the updated thematic playlist as the second media item to play.

24. The peer device of claim 1 wherein in order to send the media recommendation for the first media item such that the media recommendation is sent to the at least one of the one or more peer devices of the one or more second users participating in the thematic playback session, the control system is adapted to send the media recommendation for the first media item to a recommendation server.

25. The peer device of claim 24 wherein the recommendation server sends the media recommendation for the first media item to the at least one of the one or more peer devices of the one or more second users participating in the thematic playback session.

26. The peer device of claim 24 wherein the recommendation server sends the media recommendation for the first media item to all of the one or more peer devices of the one or more second users participating in the thematic playback session.

27. A method of operation of a peer device in a Peer-to-Peer (P2P) media recommendation system comprising:
initializing a thematic playlist for a first user of the peer device to include one or more media items satisfying one or more parameters for a thematic playback session;
starting playback of a first media item from the thematic playlist;
during playback of the first media item, receiving one or more media recommendations from at least one of one or more peer devices of one or more second users participating in the thematic playback session;
updating the thematic playlist of the first user to include one or more recommended media items identified by the one or more media recommendations to provide an updated thematic playlist; and
upon completion of playback of at least a predetermined amount of the first media item:
sending a media recommendation for the first media item such that the media recommendation is sent to at least one of the one or more peer devices of the one or more second users participating in the thematic playback session;
selecting a second media item to play from the updated thematic playlist; and
starting playback of the second media item.

28. A computer readable medium storing software for instructing a computing device operating as a peer device in a Peer-to-Peer (P2P) media recommendation system to:
initialize a thematic playlist for a first user of the peer device to include one or more media items satisfying one or more parameters for a thematic playback session;
begin playback of a first media item from the thematic playlist;
during playback of the first media item, receive one or more media recommendations from at least one of one or more peer devices of one or more second users participating in the thematic playback session;
update the thematic playlist of the first user to include one or more recommended media items identified by the one or more media recommendations to provide an updated thematic playlist; and
upon completion of playback of at least a predetermined amount of the first media item:
send a media recommendation for the first media item such that the media recommendation is sent to at least one of the one or more peer devices of the one or more second users participating in the thematic playback session;
select a second media item to play from the updated thematic playlist; and
begin playback of the second media item.

29. A central system in a Peer-to-Peer (P2P) media recommendation system comprising:
a communication interface; and
a control system associated with the communication interface and adapted to:
receive a request for a thematic playback session from a first peer device of a first user in the P2P media recommendation system;
send invitations to a plurality of other users of a plurality of other peer devices in the P2P media recommendation system;
receive a response from one or more second users of the plurality of other users indicating that the one or more second users desire to join the thematic playback session;
receive, from the first peer device, a media recommendation for a media item played by the first peer device; and send the media recommendation to at least one of one or more second peer devices of the one or more second users.

30. The central system of claim 29 wherein the control system is further adapted to tag the media recommendation for the media item played by the first peer device as a thematic media recommendation.

31. The central system of claim 30 wherein the control system is further adapted to:
- receive a media recommendation for a media item played by a third peer device in the P2P media recommendation system that is not participating in the thematic playback session;
- identify a second user of the one or more second users as a recipient of the media recommendation for the media item played by the third peer device; and
- send the media recommendation for the media item played by the third peer device to a second peer device of the second user without tagging the media recommendation for the media item played by the third peer device as a thematic media recommendation.

32. The central system of claim 29 wherein the control system is further adapted to:
- receive a media recommendation for a media item played by a third peer device in the P2P media recommendation system that is not participating in the thematic playback session;
- identify a second user of the one or more second users as a recipient of the media recommendation for the media item played by the third peer device; and
- store the media recommendation for the media item played by the third peer device for subsequent delivery to a second peer device of the second user after the second user is no longer participating in the thematic playback session.

33. A method of operation of a central system in a Peer-to-Peer (P2P) media recommendation system comprising:
- receiving a request for a thematic playback session from a first peer device of a first user in the P2P media recommendation system;
- sending invitations to a plurality of other users of a plurality of other peer devices in the P2P media recommendation system;
- receiving a response from one or more second users of the plurality of other users indicating that the one or more second users desire to join the thematic playback session;
- receiving, from the first peer device, a media recommendation for a media item played by the first peer device; and
- sending the media recommendation to at least one of one or more second peer devices of the one or more second users.

34. A computer readable medium storing software for instructing a computing device operating as a central system in a Peer-to-Peer (P2P) media recommendation system to:
- receive a request for a thematic playback session from a first peer device of a first user in the P2P media recommendation system;
- send invitations to a plurality of other users of a plurality of other peer devices in the P2P media recommendation system;
- receive a response from one or more second users of the plurality of other users indicating that the one or more second users desire to join the thematic playback session;
- receive, from the first peer device, a media recommendation for a media item played by the first peer device; and
- send the media recommendation to at least one of one or more second peer devices of the one or more second users.

* * * * *